US012666418B2

(12) United States Patent
Hoang et al.

(10) Patent No.: US 12,666,418 B2
(45) Date of Patent: Jun. 23, 2026

(54) SIDELINK DISCOVERY ASSOCIATED WITH NR RELAYS

(71) Applicant: InterDigital Patent Holdings, Inc., Wilmington, DE (US)

(72) Inventors: Tuong Duc Hoang, Montreal (CA); Martino M. Freda, Laval (CA); Tao Deng, Roslyn, NY (US); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/654,122

(22) Filed: May 3, 2024

(65) Prior Publication Data

US 2024/0306145 A1 Sep. 12, 2024

Related U.S. Application Data

(63) Continuation of application No. 18/019,902, filed as application No. PCT/US2021/044660 on Aug. 5, 2021.

(Continued)

(51) Int. Cl.
*H04W 72/1263* (2023.01)
*H04W 72/40* (2023.01)
*H04W 72/566* (2023.01)

(52) U.S. Cl.
CPC ....... *H04W 72/1263* (2013.01); *H04W 72/40* (2023.01); *H04W 72/566* (2023.01)

(58) Field of Classification Search
CPC ............. H04W 72/1263; H04W 72/40; H04W 72/566
See application file for complete search history.

(56) References Cited

U.S. PATENT DOCUMENTS

2018/0070264 A1 3/2018 Saiwai et al.
2019/0007910 A1 1/2019 Akula et al.
(Continued)

FOREIGN PATENT DOCUMENTS

EP 3206452 B1 10/2019
JP 2016539603 A 12/2016
(Continued)

OTHER PUBLICATIONS

3GPP TR 36.746 V15.1.1, "Study on further enhancements to LTE Device to Device (D2D), User Equipment (UE) to network relays for Internet of Things (IoT) and wearables, (Release 15)", 3rd Generation Partnership Project; Technical Specification Group Radio Access Network, Apr. 2018, 55 pages.
(Continued)

*Primary Examiner* — Rhonda L Murphy
(74) *Attorney, Agent, or Firm* — Condo Roccia Koptiw LLP

(57) ABSTRACT

Systems, methods, and instrumentalities are described herein for sidelink discovery, for example, associated with relays, e.g., NR relays. Discovery data may be transmitted, for example, to initialize communication between devices. Discovery data may be transmitted alone or multiplexed with other data (e.g., sidelink data). Discovery data with a high priority may be transmitted alone. Discovery data with a low priority may be multiplexed with other data (e.g., other data received within a duration of time). Discovery data may be multiplexed with other data that share the same destination identity. Resource allocation may be performed, for example, based on whether the discovery data is transmitted alone or multiplexed with other data.

10 Claims, 8 Drawing Sheets

Related U.S. Application Data

(60) Provisional application No. 63/185,579, filed on May 7, 2021, provisional application No. 63/136,379, filed on Jan. 12, 2021, provisional application No. 63/089,096, filed on Oct. 8, 2020, provisional application No. 63/061,470, filed on Aug. 5, 2020.

(56) References Cited

U.S. PATENT DOCUMENTS

| | | | | |
|---|---|---|---|---|
| 2019/0357284 A1* | 11/2019 | Xu | .................... | H04W 76/14 |
| 2020/0008183 A1* | 1/2020 | Chen | .................... | H04W 72/20 |
| 2020/0178221 A1* | 6/2020 | Byun | .................... | H04W 72/23 |

FOREIGN PATENT DOCUMENTS

| | | |
|---|---|---|
| JP | 2018191333 A | 11/2018 |
| JP | 2019508931 A | 3/2019 |
| WO | 2015065130 A1 | 5/2015 |
| WO | 2017029577 A1 | 2/2017 |
| WO | 2019059123 A1 | 3/2019 |
| WO | 2020056578 A1 | 3/2020 |
| WO | 2020092742 A1 | 5/2020 |

OTHER PUBLICATIONS

RP-193253, "New SID: Study on NR Sidelink Relay", OPPO, 3GPP TSG RAN Meeting #86, Sitges, Spain, Dec. 9-12, 2019, pp. 1-5.

S2-2003849, "ProSe_Evaluation and conclusion for KI#1 Direct Discovery", 3GPP SA WG2 Meeting #139E; OPPO, CATT; Elbonia, Jun. 1-12, 2020, 4 pages.

TS 23.287 V16.3.0, "3rd Generation Partnership Project", Technical Specification Group Services and System Aspects Architecture Enhancements for 5G System (5GS) to Support Vehicle-to-Everything (V2X) Services (Release 16), Jul. 2020, pp. 1-57.

TS 36.300 V15.4.0, "3rd Generation Partnership Project (3GPP)", Technical Specification Group Radio Access Network, Evolved Universal Terrestrial Radio Access (E-UTRA) and Evolved Universal Terrestrial Radio Access Network (E-UTRAN), Overall description, Stage 2 (Release 15), Dec. 2018, pp. 1-363.

TS 38.300 V15.10.0, "3rd Generation Partnership Project", Technical Specification Group Radio Access Network, NR, NR and NG-RAN Overall Description, Stage 2 (Release 15), Jul. 2020, pp. 1-100.

3rd Generation Partnership Project "3GPP" R2-2006761, "Discovery procedure for SL relay", 3GPP RAN WG2 Meeting #111-e, Electronic, Aug. 17-28, 2020, 4 pages.

* cited by examiner

SIDELINK DISCOVERY ASSOCIATED WITH NR RELAYS

CROSS-REFERENCE TO RELATED APPLICATIONS

This application is a continuation of U.S. patent application Ser. No. 18/019,902, filed Feb. 6, 2023, which is the National Stage Entry under 35 U.S.C. § 371 of Patent Cooperation Treaty Application No. PCT/US2021/044660, filed Aug. 5, 2021, which claims the benefit of Provisional U.S. Patent Application No. 63/061,470, filed Aug. 5, 2020, Provisional U.S. Patent Application No. 63/089,096, filed Oct. 8, 2020, Provisional U.S. Patent Application No. 63/136,379, filed Jan. 12, 2021, and Provisional U.S. Patent Application No. 63/185,579, filed May 7, 2021, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for sidelink discovery, for example, associated with relays, e.g., NR relays. Discovery data may be transmitted, for example, to initialize communication between devices. Discovery data may be transmitted alone or multiplexed with other data (e.g., sidelink data). Discovery data with a high priority may be transmitted alone. Discovery data with a low priority may be multiplexed with other data (e.g., other data received within a duration of time). Discovery data may be multiplexed with other data that share the same destination identity. Resource allocation may be performed, for example, based on whether the discovery data is transmitted alone or multiplexed with other data.

A wireless transmit/receive unit (WTRU) may be used in transmission of discovery data and/or other data. The WTRU may receive discovery data (e.g., discovery data may arrive at the WTRU). The discovery data may be associated with a priority value and a first destination identity. The WTRU may determine whether the priority value is above a threshold value. The WTRU may determine transmission contents (e.g., whether or not to multiplex discovery data with sidelink communication data) based on the priority value. The WTRU may determine the transmission contents based on whether sidelink communication data is received during a duration of time, for example, if the priority value is above the threshold value. The duration of time may be determined, for example, based on the priority value and/or a channel busy ratio (CBR). The WTRU may receive sidelink communication data (e.g., sidelink communication data may arrive at the WTRU), for example, during the duration of time. The sidelink communication data may be associated with a second destination identity. The WTRU may determine that the transmission includes the discovery data multiplexed with the sidelink communication data, for example, if the sidelink communication data is received during the duration of time and the first destination identity and the second destination identity are the same. The WTRU may determine that the transmission includes the discovery data (e.g., only the discovery data), for example, if sidelink communication data is not received during the duration of time or the first destination identity and the second destination identity are not the same.

The WTRU may perform resource allocation, for example, based on whether the discovery data is transmitted alone or multiplexed with sidelink communications data. The WTRU may determine transmission parameter(s) based on whether the discovery data is multiplexed with sidelink communication data. The transmission parameter(s) may include a number of subchannels, a number of retransmissions, a transmission power, and/or a modulation and coding scheme (MCS).

DETAILED DESCRIPTION

Figure 1A:
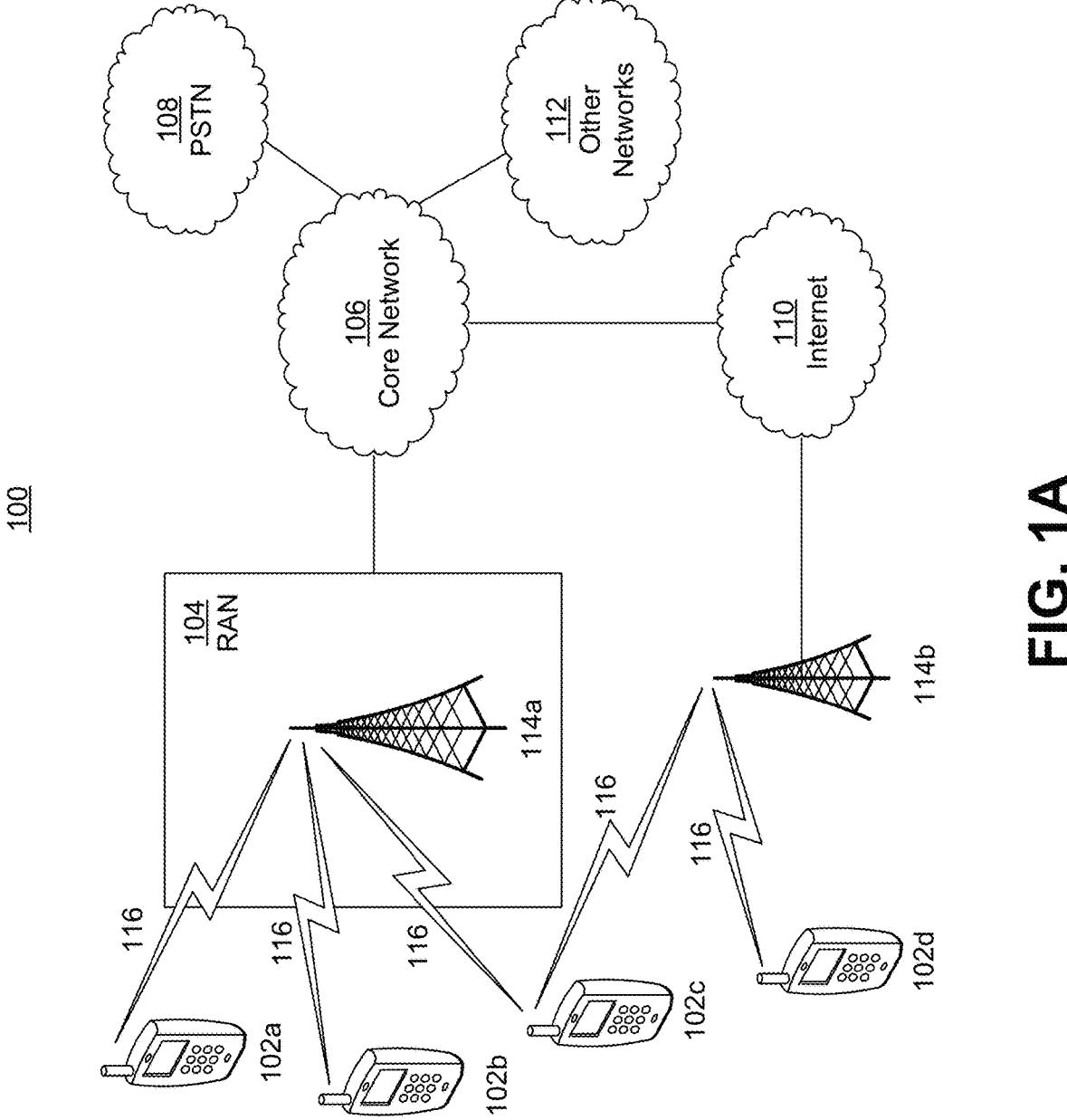
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
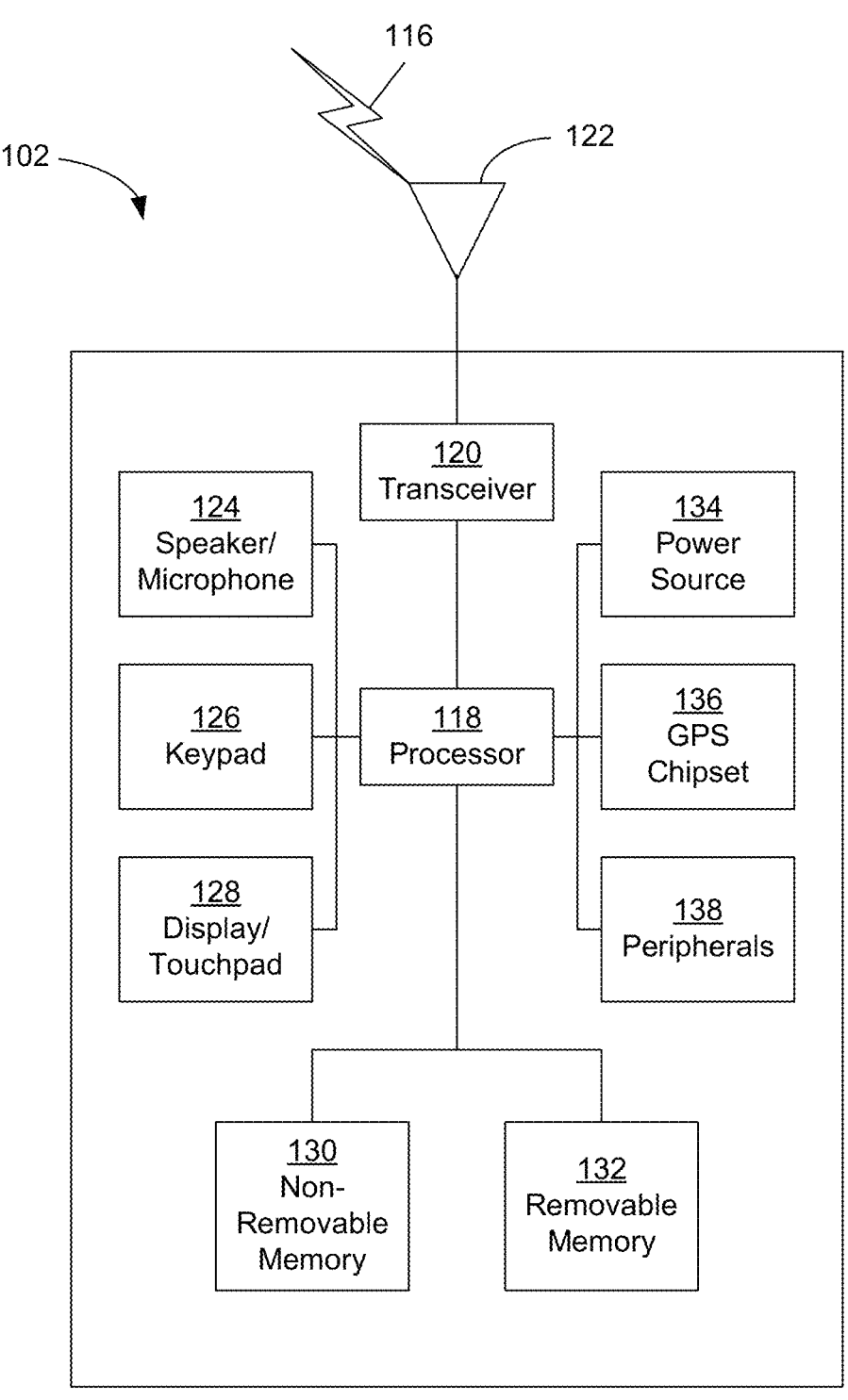
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
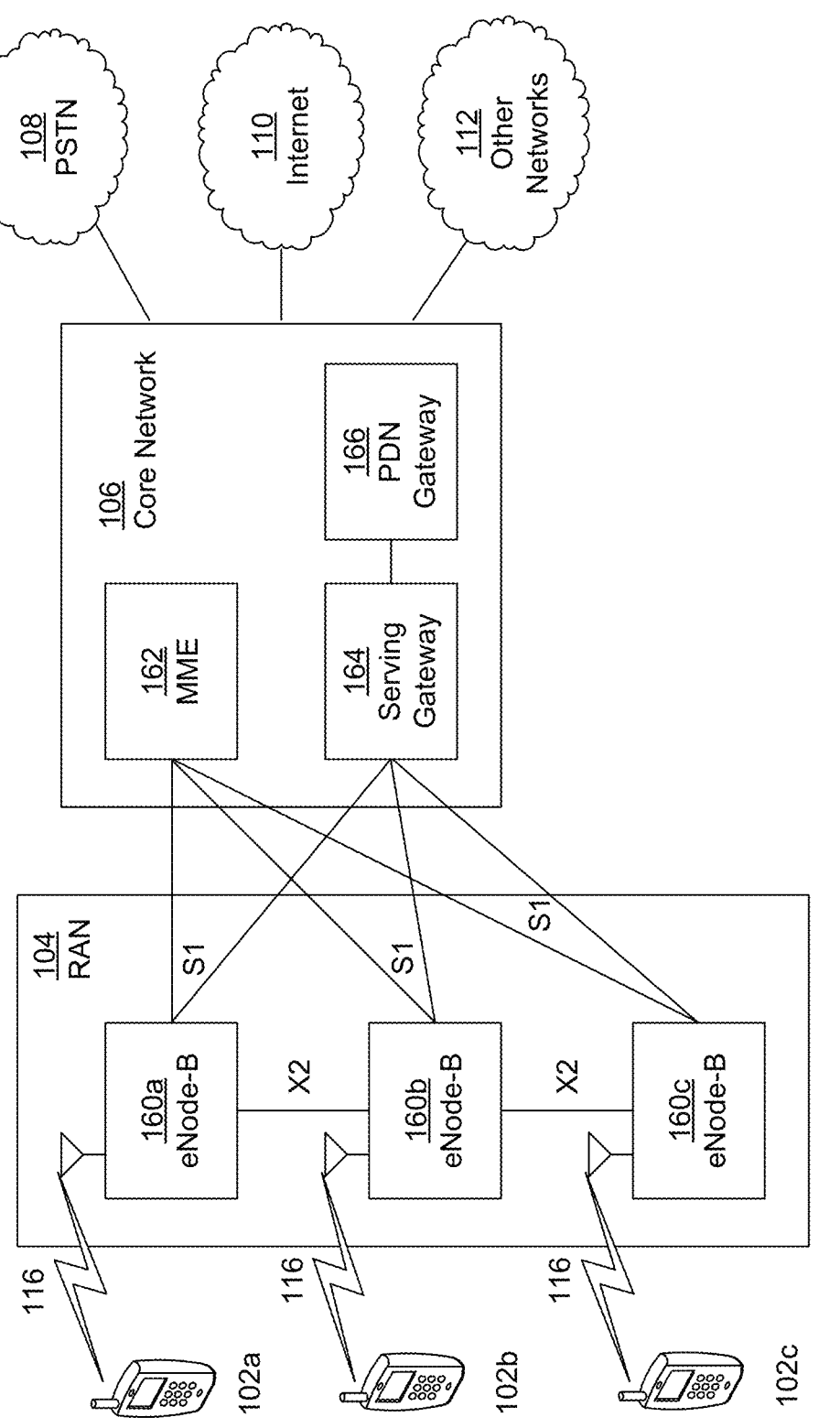
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
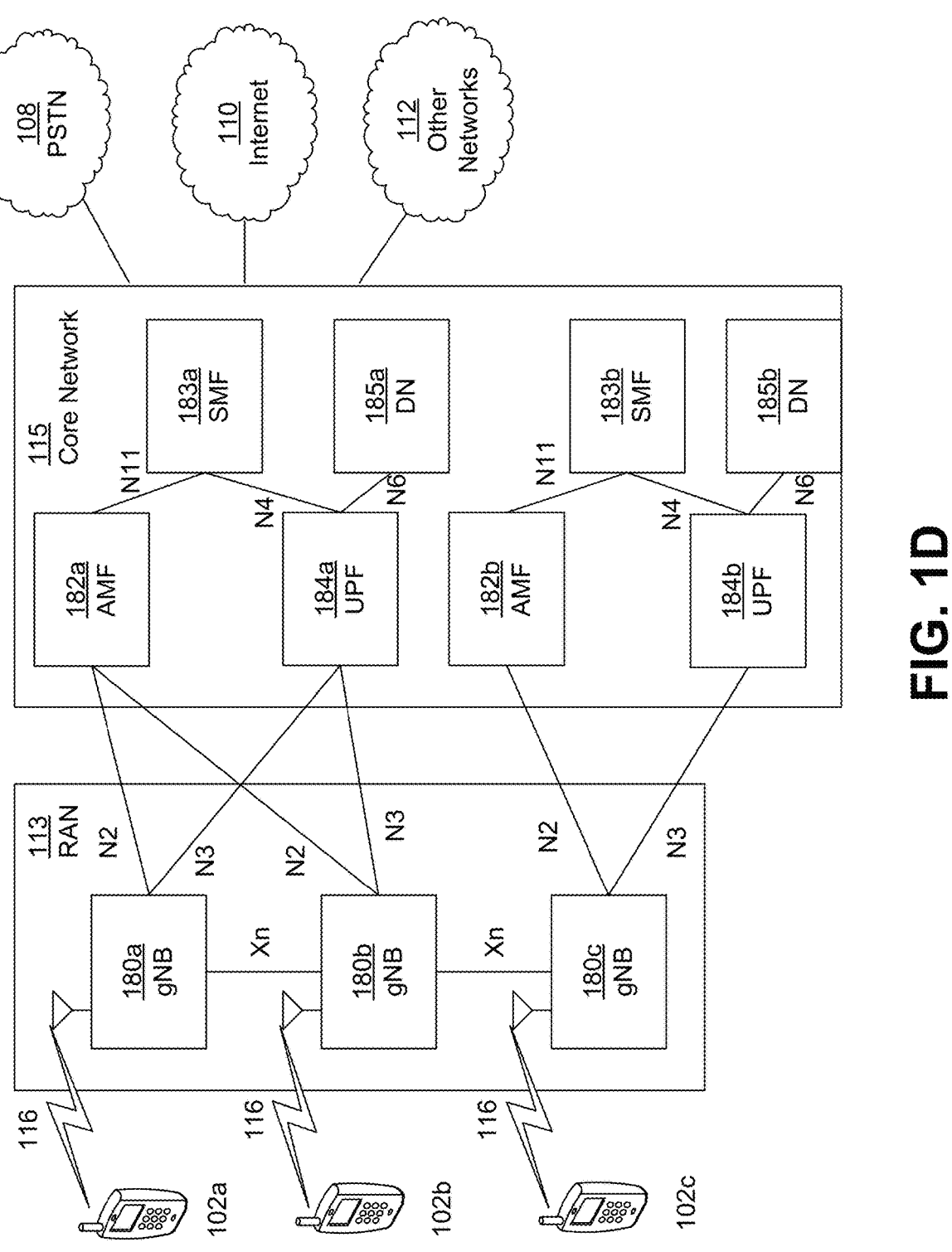
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for sidelink discovery, for example, associated with relays, e.g., NR relays. Discovery data may be transmitted, for example, to initialize communication between devices. Discovery data may be transmitted alone or multiplexed with other data (e.g., sidelink data). Discovery data with a high priority may be transmitted alone. Discovery data with a low priority may be multiplexed with other data (e.g., other data received within a duration of time). Discovery data may be multiplexed with other data that share the same destination identity. Resource allocation may be performed, for example, based on whether the discovery data is transmitted alone or multiplexed with other data.

A wireless transmit/receive unit (WTRU) may be used in transmission of discovery data and/or other data. The WTRU may receive discovery data (e.g., discovery data may arrive at the WTRU). The discovery data may be associated with a priority value and a first destination identity. The WTRU may determine whether the priority value is above a threshold value. The WTRU may determine transmission contents (e.g., whether or not to multiplex discovery data with sidelink communication data) based on the priority value. The WTRU may determine the transmission contents based on whether sidelink communication data is received during a duration of time, for example, if the priority value is above the threshold value. The duration of time may be determined, for example, based on the priority value and/or a channel busy ratio (CBR). The WTRU may receive sidelink communication data (e.g., sidelink communication data may arrive at the WTRU), for example, during the duration of time. The sidelink communication data may be associated with a second destination identity. The WTRU may determine that the transmission includes the discovery data multiplexed with the sidelink communication data, for example, if the sidelink communication data is received during the duration of time and the first destination identity and the second destination identity are the same. The WTRU may determine that the transmission includes the discovery data (e.g., only the discovery data), for example, if sidelink communication data is not received during the duration of time or the first destination identity and the second destination identity are not the same.

The WTRU may perform resource allocation, for example, based on whether the discovery data is transmitted alone or multiplexed with sidelink communications data. The WTRU may determine transmission parameter(s) based on whether the discovery data is multiplexed with sidelink communication data. The transmission parameter(s) may include a number of subchannels, a number of retransmissions, a transmission power, and/or a modulation and coding scheme (MCS).

A wireless transmit/receive unit (WTRU) may inform a gNB of the availability of discovery data, for example, using a scheduling request (SR), buffer status report (BSR), and/or a radio resource control (RRC) message. A WTRU may perform prioritization between discovery transmission/reception and other sidelink and/or uplink transmission/reception, for example, based on a quality of service (QOS) of the data and/or other conditions. A WTRU may determine the transmission behavior of a message based on, for example, one or more of the following: types of data multiplexed in a transport block (TB); an arrival time of discovery data within a discovery period; a QoS of a message (e.g., discovery message); a channel busy ratio (CBR) of a resource pool and/or a channel occupancy ratio (CR) of a WTRU; past transmission activity of a WTRU; and/or the like. A WTRU may (e.g., determine to) multiplex a discovery message with a data transmission with the same destination identifier (ID), for example, based on a discovery message priority and a delay requirement. A WTRU may prioritize transmissions among different resource pools, for example, based on a QoS of a message and a (pre)configured priority of a resource pool.

In an example, a WTRU may (e.g., determine to) multiplex a discovery message with a data transmission with the same destination ID, for example, based on a discovery message priority and delay requirement. The WTRU may be configured with one or more destinations for a discovery transmission. The WTRU may perform sensing and/or resource selection to transmit a discovery message, for example, if the priority of the discovery data is smaller than a threshold. The WTRU may, otherwise, track a discovery resource selection time (e.g., initiate a discovery resource selection timer). A duration of time (e.g., timer) may be determined, for example, based on the priority and/or the discovery period of the resource pool. A WTRU may stop tracking the duration of time (e.g., via the timer), multiplex the discovery data with communication data, and perform sensing and/or resource allocation for a MAC PDU having discovery data, for example, if/when the duration of time (e.g., via the timer) is running and if communication data associated with one of the configured destinations arrives. The WTRU may perform sensing and/or resource allocation to transmit a standalone discovery message, for example, upon expiry of the discovery resource selection time (e.g., via the discovery resource selection timer). The WTRU may perform resource selection for the transmission having discovery data. The WTRU may determine the transmission parameters (e.g., number of subchannels used for each transmission, number of retransmissions, parameters associated with transmission power, MCS, etc.), for example, based on whether the discovery data is multiplexed with data. The WTRU may apply time and/or frequency restrictions among the selected resources (e.g., the frequency gap and/or time gap between the two selected resources may be greater than one threshold and smaller than another threshold).

In an example, a WTRU may prioritize between data and discovery transmission, for example, based on a (pre)configured priority of the discovery and data resource pools and the priority of the data transmission. The WTRU may be configured with multiple (e.g., two) transmission resource pools, for example, one for discovery transmission and another one for data transmission, where the transmission resource pools may overlap in time and/or frequency. The WTRU may be configured with one priority threshold for a data resource pool and another priority threshold for a discovery resource pool. The WTRU may prioritize between data and discovery resources in a resource selection procedure. The WTRU may perform resource selection for a data TB. The WTRU may exclude the time/frequency overlapping with the discovery resource pool, for example, if the priority of the data TB is larger than the configured priority threshold. The WTRU may perform resource selection for a discovery TB. The WTRU may exclude the time/frequency overlapping with the data resource pool, for example, if the priority of discovery TB is larger than another configured threshold.

Systems, methods, and instrumentalities are described herein associated with discovery. A WTRU may determine whether to transmit a discovery message, e.g., based on one or more parameters. A WTRU may trigger monitoring and/or stop monitoring of a discovery resource pool, e.g., based on one or more parameters. A WTRU may determine the monitoring resource pool based on its power saving state. A WTRU may include the ID associated with a group in the discovery message. A relay WTRU may determine whether to forward a discovery message.

A WTRU may determine the values of one or more fields (e.g., each field) in an SL BSR associated with discovery data. A WTRU may determine the order of destination(s) to report. A WTRU may use a MAC sub-header to indicate the availability of discovery data. A WTRU may use a MAC header for transmission of a discovery message. A WTRU may indicate an L2 ID to an upper layer, for example, by reading a MAC header of a discovery message. A WTRU may be (pre-)configured with multiple discovery types. A WTRU may select a discovery type. A WTRU may select one or more resource pools for discovery transmission.

A WTRU may determine whether to transmit sidelink data based on discovery transmission/reception. A WTRU may perform congestion control for discovery data. A WTRU may determine which resource pool to transmit discovery data. The WTRU may switch discovery transmission to another resource pool. The WTRU may indicate the transmission power of the discovery message. The WTRU may perform RSRP measurements based on the transmission power indication from the Tx WTRU. The WTRU may determine the RSRP threshold to perform relay (re)selection. The WTRU may determine to select L2 or L3 relay. The WTRU may determine the procedure to get the configuration related to a relay service. The WTRU may determine whether to act as an L2 or L3 relay based on an indication from a gNB. The WTRU may determine whether to select an L2 or L3 relay based on an indication from the gNB. The WTRU may send an RLF indication to remote WTRUs. The WTRU may determine whether to perform cell (re)selection or relay (re)selection first. The WTRU may determine the threshold for cell (re)selection.

NR sidelink relay may support WTRU to network relays and WTRU to WTRU relays. NR sidelink may support vehicle to everything (V2X) related road safety services. Support may be provided for broadcast, groupcast and unicast communications in both out-of-coverage and in-network coverage scenarios. Sidelink-based relaying functionality may support sidelink/network coverage extension and power efficiency improvement, e.g., for a wide range of applications and services.

Coverage extension may be provided for sidelink-based communication. WTRU-to-network coverage extension may be provided. Uu coverage reachability may permit WTRUs to reach a server in a packet data network (PDN) or a counterpart WTRU outside a proximity area. WTRU-to-network relay coverage extension may utilize evolved universal terrestrial radio access (EUTRA)-based technology, which may not be applicable to an NR-based system, for NG-RAN and NR-based sidelink communication. WTRU-to-WTRU coverage extension may be provided. Proximity reachability may be applied to a single-hop sidelink link (e.g., via EUTRA-based or NR-based sidelink), which may not be applicable, for example, if there is no Uu coverage. Sidelink connectivity may be extended (e.g., further extended) in an NR framework, for example, to support enhanced quality of service (QOS).

Single hop NR sidelink relays may support sidelink-based WTRU-to-network and WTRU-to-WTRU relays, for example, based on using relay selection (e.g., reselection); relay/remote WTRU authorization; QoS for relaying operations; service continuity; security of a relayed connection (e.g., after SA3 has provided its conclusions); and/or a user plane protocol stack and control plane procedure (e.g., connection management of relayed connection). Upper layer operations (e.g., discovery model/procedure) for sidelink relaying may be supported (e.g., without a physical layer channel/signal). A WTRU-to-network relay and WTRU-to-WTRU relay may use the same sidelink relaying. A WTRU-to-network relay may implement an end-to-end packet data convergence protocol (PDCP) and hop-by-hop radio link control (RLC).

WTRU to network relays may be implemented. Relaying may be implemented, for example, via proximity services (ProSe) WTRU to network relays, for example, to extend network coverage to an out of coverage WTRU, e.g., by using PC5 (e.g., device to device (D2D) communication between an out of coverage WTRU and a WTRU-to-network relay.

A ProSe WTRU-to-network relay may provide an L3 forwarding function (e.g., a generic L3 forwarding function) that may relay internet protocol (IP) traffic (e.g., any type of IP traffic) between a remote WTRU and the network. One-to-one and one-to-many sidelink communications may be used between remote WTRU(s) and a ProSe WTRU-to-network relay. A (e.g., only one) single carrier (e.g., public safety ProSe carrier) operation may be supported (e.g., Uu and PC5 may be the same carrier for a relay/remote WTRU), for example, for a remote WTRU and a relay WTRU. A remote WTRU may be authorized by upper layers. A remote WTRU may be in-coverage of a public safety ProSe carrier or out-of-coverage on (e.g., any) supported carriers (e.g., including a public safety ProSe carrier) for WTRU-to-network relay discovery, selection (e.g., (re)selection), and communication. A ProSe WTRU-to-network relay may be in-coverage (e.g., always in-coverage) of an EUTRA network (EUTRAN). A ProSe WTRU-to-network relay and a remote WTRU may perform sidelink communication and sidelink discovery.

Relay selection for WTRU to network (NW) relays may be provided. Relay selection/reselection for ProSe WTRU to NW relays may be performed, for example, based on a combination of access stratum (AS) layer quality measurements (e.g., reference signal received power (RSRP)) and upper layer criteria.

An eNB may control whether a WTRU can act as a ProSe WTRU-to-network relay. ProSe WTRU-to-network relay operation may be supported in a cell, for example, if an eNB broadcasts any information that may be associated with ProSe WTRU-to-network relay operation.

An eNB may provide transmission resources for ProSe WTRU-to-network relay discovery, e.g., using signaling (e.g., broadcast signaling) for a radio resource control (RRC) idle state (RRC_IDLE state) and signaling (e.g., dedicated signaling) for an RRC_CONNECTED state. An eNB may provide reception resources for ProSe WTRU-to-network relay discovery, e.g., using broadcast signaling. An eNB may broadcast a minimum and/or a maximum Uu link quality (e.g., RSRP) threshold(s) that a ProSe WTRU-to-Network Relay may comply with, e.g., before initiating a WTRU-to-network relay discovery procedure. A WTRU may (e.g., in RRC_IDLE, if an eNB broadcasts transmission resource pools) use the threshold(s), for example, to (e.g., autonomously) start or stop a WTRU-to-network relay discovery procedure. A WTRU may (e.g., in RRC_CONNECTED) use the threshold(s) to determine, for example, if the WTRU can indicate to an eNB that the WTRU is a relay WTRU and wants to start ProSe WTRU-to-network relay discovery. A WTRU may initiate a request for ProSe-WTRU-to-network relay discovery resources (e.g., by dedicated signaling, respecting broadcasted threshold(s)), for example, if an eNB does not broadcast transmission resource pools for ProSe-WTRU-to-network relay discovery.

A ProSe-WTRU-to-network relay may perform ProSe WTRU-to-network relay discovery (e.g., in RRC_IDLE), for example, if the ProSe-WTRU-to-network relay is initiated by broadcast signaling. A ProSe WTRU-to-network relay may perform relay discovery (e.g., in RRC_CON- NECTED), for example, if the ProSe WTRU-to-network relay is initiated by dedicated signaling.

A ProSe WTRU-to-network relay that may perform (e.g., is performing) sidelink communication for ProSe WTRU-to-network relay operation may be in RRC_CONNECTED. A ProSe WTRU-to-network relay may receive a layer-2 link establishment request or temporary mobile group identity (TMGI) monitoring request (e.g., an upper layer message) from a remote WTRU. The ProSe WTRU-to-network relay may indicate to an eNB that it is a ProSe WTRU-to-network relay and intends to perform ProSe WTRU-to-network relay sidelink communication. The eNB may provide resources for ProSe WTRU-to-network relay communication.

A remote WTRU may decide to start monitoring (e.g., when to start monitoring) for ProSe WTRU-to-network relay discovery. The remote WTRU may transmit ProSe WTRU-to-network relay discovery solicitation messages, for example, while in RRC_IDLE or in RRC_CONNECTED, e.g., depending on the configuration of resources for ProSe WTRU-to-network relay discovery. An eNB may broadcast a threshold, which may be used by the remote WTRU, for example, to determine if the remote WTRU can transmit ProSe WTRU-to-network relay discovery solicitation messages, e.g., to connect or communicate with a ProSe WTRU-to-network relay WTRU. The RRC_CONNECTED remote WTRU may use the broadcasted threshold to determine, for example, if it can indicate to the eNB that it is a remote WTRU and wants to participate in ProSe WTRU-to-network relay discovery and/or communication. The eNB may provide transmission resources (e.g., using broadcast or dedicated signaling) and reception resources (e.g., using broadcast signaling) for ProSe WTRU-to-network relay operation. The remote WTRU may stop using ProSe WTRU-to-network relay discovery and communication resources, for example, if RSRP goes above the broadcasted threshold. The time of traffic switching from Uu to PC5 or vice versa may be determined, for example, by a higher layer.

A remote WTRU may perform radio measurements (e.g., at a PC5 interface) and may use the measurements (e.g., with higher layer criterion), for example, for ProSe WTRU-to-network relay selection and reselection. A ProSe WTRU-to-network relay may be considered suitable (e.g., in terms of radio criteria), for example, if the PC5 link quality exceeds a configured threshold (e.g., pre-configured or provided by an eNB). The remote WTRU may select a ProSe WTRU-to-network relay that satisfies higher layer criterion and provides the highest PC5 link quality among (e.g., all) suitable ProSe WTRU-to-network relays. The remote WTRU may trigger ProSe WTRU-to-network relay reselection, for example, if the PC5 signal strength of a ProSe WTRU-to-network relay (e.g., current ProSe WTRU-to-network relay) is below a configured signal strength threshold; and/or the remote WTRU receives a layer-2 link release message (e.g., an upper layer message) from the ProSe WTRU-to-network relay.

WTRU to network relays may be provided for wearables. WTRU to NW relays may support wearables and IoT devices, for example, in a RAN. ProSe WTRU to NW relays may use an L3 (e.g., an internet protocol (IP) layer) relay. WTRU to NW relays for wearables may use, for example, an L2 relay.

Figure 2:
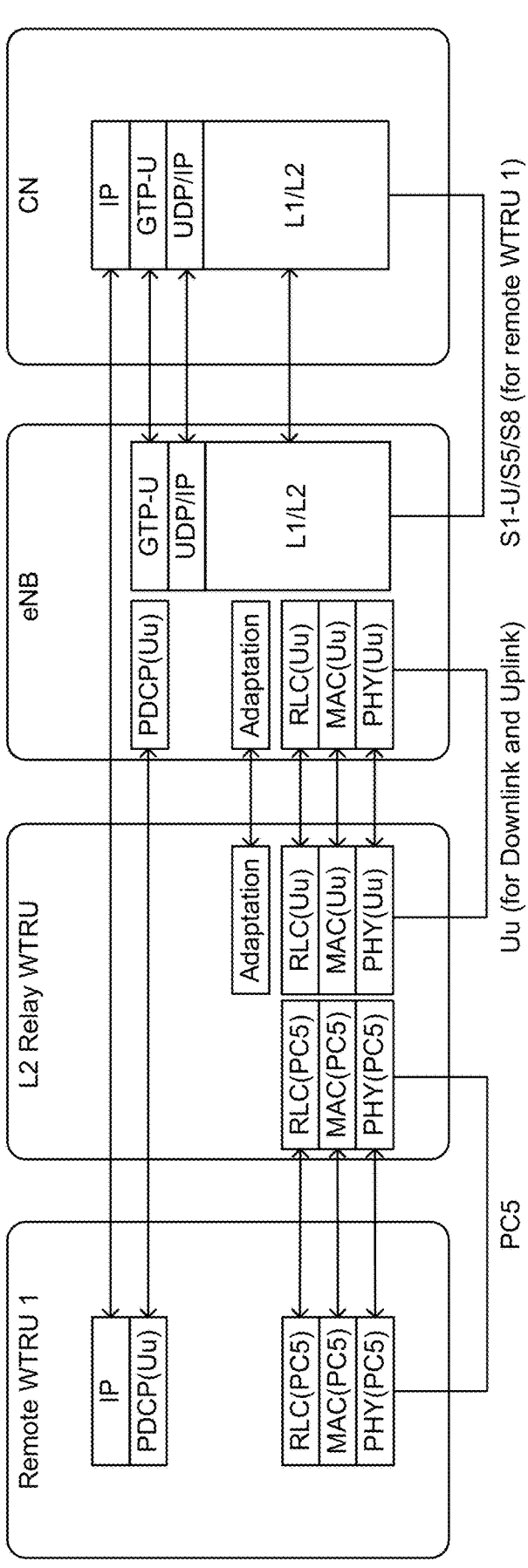
FIG. 2 illustrates an example of a user plane radio protocol stack for layer 2 evolved WTRU-to-Network relay.

FIG. 2 is a diagram illustrating an example of a user plane radio protocol stack for layer 2 evolved WTRU-to-Network relay (e.g., with a PC5 interface).

Figure 3:
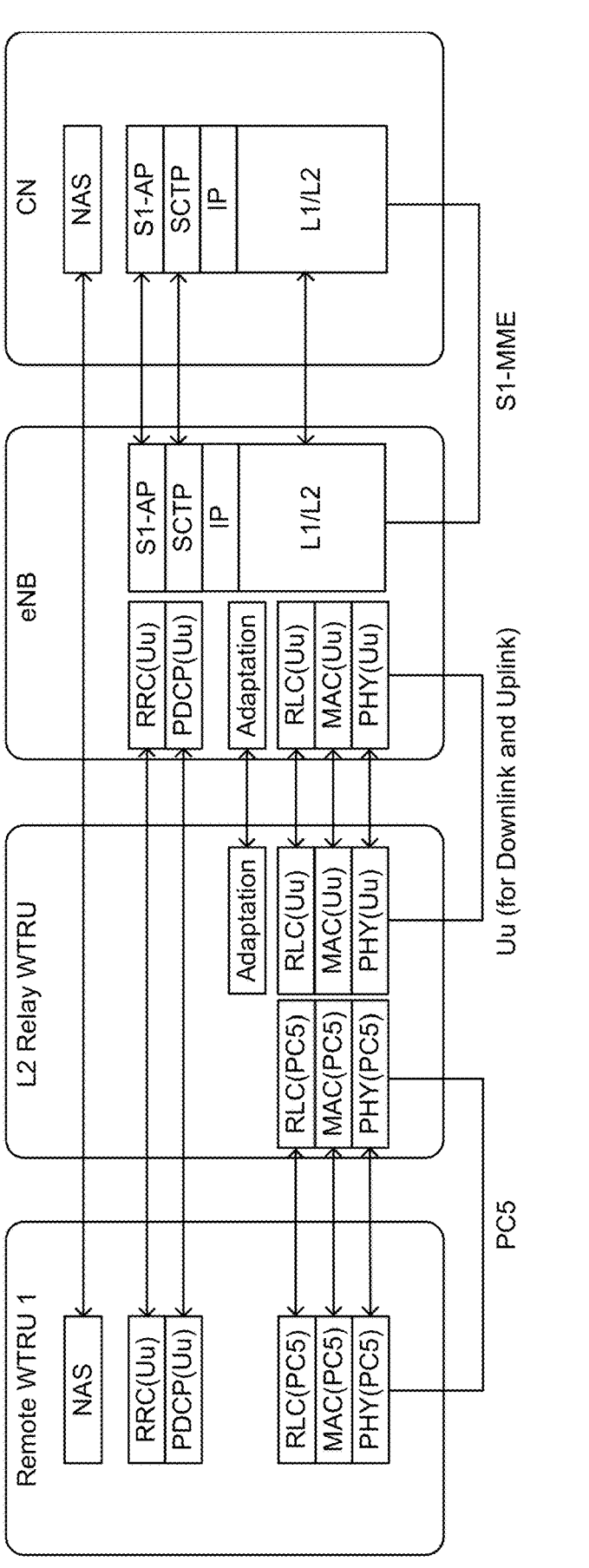
FIG. 3 illustrates an example of a control plane radio protocol stack for layer 2 evolved WTRU-to-Network relay.

FIG. 3 is a diagram illustrating an example of a control plane radio protocol stack for layer 2 evolved WTRU-to-network relay (e.g., with a PC5 interface).

Connection establishment may be provided for unicast links in NR V2X. A use of a relay (e.g., for LTE) may be based on, for example, a one to one communication link established at upper layers (e.g., a ProSe layer) between multiple (e.g., two) WTRUs (e.g., a remote WTRU and a WTRU to NW relay). A connection may be transparent to the AS layer. Connection management signaling and procedures performed at the upper layers may be carried by AS layer data channels. The AS layer may be unaware of a one to one connection.

An AS layer may (e.g., in NR V2X) support a unicast link between multiple (e.g., two) WTRUs. A unicast link may be initiated, for example, by upper layers (e.g., as in a ProSe one-to-one connection). The AS layer may be informed of the presence of a unicast link and any data that may be transmitted in unicast fashion between the peer WTRUs. The AS layer may (e.g., with this knowledge) support hybrid automatic repeat request (HARQ) feedback, channel quality indicator (CQI) feedback, and power control schemes (e.g., that may be specific to unicast).

A unicast link at the AS layer may be supported, for example, via a PC5-RRC connection. A PC5-RRC connection may be, for example, a logical connection between a pair of a source layer-2 ID and a destination layer-2 ID in the AS. In examples, a (e.g., one) PC5-RRC connection may correspond to a (e.g., one) PC5 unicast link. PC5-RRC signaling may be initiated, for example, after a corresponding PC5 unicast link establishment. A PC5-RRC connection and corresponding sidelink signaling radio bearers (SRBs) and sidelink data radio bearer (DRBs) may be released, for example, if a PC5 unicast link is released (e.g., as may be indicated by upper layers).

In examples, for a (e.g., each) PC5-RRC connection of unicast, a (e.g., one) sidelink SRB may (e.g., be used to) transmit the PC5-S messages, for example, before the PC5-S security has been established. A (e.g., one) sidelink SRB may (e.g., be used to) transmit the PC5-S messages to establish the PC5-S security. A (e.g., one) sidelink SRB may (e.g., be used to) transmit the PC5-S messages, for example, after the PC5-S security has been established. The PC5-S messages may be protected. A (e.g., one) sidelink SRB may (e.g., be used to) transmit the PC5-RRC signaling, which may be protected and sent (e.g., only) after the PC5-S security has been established.

PC5-RRC signaling may include a sidelink configuration message (e.g., RRCReconfigurationSidelink), for example, where a WTRU may configure the receiving (RX)-related parameters of a (e.g., each) SLRB in a peer WTRU. A reconfiguration message may configure the parameters of a (e.g., each) protocol in the L2 stack (e.g., service data adaptation layer (SDAP), packet data convergence protocol (PDCP), etc.). The receiving WTRU may confirm or reject a configuration, for example, depending on whether the receiving WTRU can support the configuration suggested by the peer WTRU.

A discovery feature may permit a WTRU to transmit discovery messages. A discovery message may have a fixed size (e.g., 232 bits). A discovery message may be transmitted in a dedicated discovery resource pool, for example, using a physical downlink shared channel (PDSCH). A (e.g., each) PDSCH resource may occupy two physical resource blocks (PRBs) spanning over a (e.g., one) subframe. There may be multiple (e.g., two) resource allocation types for a discovery procedure, e.g., WTRU autonomous resource selection (type 1) and network scheduled (type 2).

A discovery procedure (e.g., for type 1 and type 2 allocation) may support consecutive transmissions (e.g., from 1 to 4 consecutive transmissions), for example, with inter-subframe frequency hopping for a (e.g., each) discovery message. A discovery procedure (e.g., for type 2 allocation) may support allocating discovery resources for a (e.g., each) discovery message (e.g., type 2A). A discovery procedure (e.g., for type 2 allocation) may support (e.g., semi-persistent) allocation of discovery resources for discovery transmissions, for example, with a discovery period from 40 ms to 10240 ms (e.g., type 2B). A discovery procedure (e.g., for type 1 allocation) may support configuring a WTRU with one or more discovery resource pools, where a (e.g., each) resource pool may support a discovery period (e.g., from 40 ms to 10240 ms). A discovery procedure (e.g., for type 1 allocation) may support randomly selecting (e.g., for each discovery message) the time and frequency of an initial transmission in a (e.g., each) discovery period.

In NR V2X, a physical sidelink (SL) control channel (PSCCH) transmission and a physical SL shared channel (PSSCH) transmission may be configured, for example, to convey control and data, respectively, on a sidelink. A PSCCH transmission and a PSSCH transmission may be time and frequency multiplexed. A (e.g., each) V2X sidelink transmission may include a PSCCH transmission and a PSSCH transmission occupying one or more subchannels spanning over a slot (e.g., one slot). A subchannel size (e.g., minimum subchannel size) in NR V2X may be, for example, 10 PRBs. WTRU autonomous sensing and resource selection (e.g., mode 2) for PSCCH/PSSCH transmission may be supported, for example, where a resource selection window may be a function of TB priority (e.g., within 100 ms).

A discovery procedure for sidelink relay (e.g., WTRU-to-network relay and WTRU-to-WTRU relay) may use one or more physical layer (PHY) channels. Sidelink discovery may be performed using, for example, NR V2X PHY channels.

When referred to herein, the term discovery message may describe any message transmitted from a WTRU to initialize direct communication (e.g., sidelink communication) with one or more other WTRUs. A discovery message may be transmitted, for example, via a direct link and/or via one or multiple relays (e.g., one or more relay WTRUs). A discovery message may be transmitted from a source WTRU, a destination WTRU, and/or a relay WTRU.

A message transmitted by a WTRU (e.g., a discovery message) may include one (e.g., at least one) or a combination of the following information: a source ID, a destination ID (e.g., information related to an offered service and/or its corresponding QoS), target user information, relay related information (e.g., such as whether a service allows a relay and/or a number (e.g., a maximum number) of hops comprised in a relay, or a relay ID), and/or authentication information (e.g., information that may be used to support security protection).

In examples, a discovery message as described herein may be used with similar functionalities (e.g., to perform similar functions) as one or more of the following NAS messages: a D2D or sidelink discovery message, or a direct communication request messages (e.g., for NR V2X).

In examples, a discovery message may include a combination of an upper layer message (e.g., an NAS message) and an AS-layer message. For example, a discovery message may comprise an upper layer message encapsulated into an AS layer message (e.g., a PC5-RRC message with an upper layer container).

Sidelink discovery may be network assisted. Sidelink discovery may be supported by resource pool configuration procedures. A WTRU may determine the resources for discovery data transmissions. In examples, a WTRU may be (pre)configured with one or more (e.g., multiple) dedicated resource pools for a discovery transmission. In examples, a WTRU may be (pre)configured with one or more resource pools. A WTRU may be (pre)configured with a set of time/frequency resources (e.g., in each resource pool) for (e.g., possible) transmission of discovery data. A WTRU may be (pre)configured with one or more resource pools for transmission of discovery data and/or other data.

Discovery information may be multiplexed, e.g., with data (e.g., sidelink communication data). A WTRU may inform a gNB of/about the availability of discovery data. A WTRU may inform a gNB of the availability of discovery data, for example, to support gNB scheduling decisions. Discovery data information may be sent, for example, via a scheduling request (SR), a medium access control (MAC) control element (CE), and/or an RRC message.

A WTRU may send an SR to indicate the availability of discovery data. A WTRU may trigger an SR to indicate the availability of discovery data. In examples, a WTRU may be (pre)configured with one or more (e.g., dedicated) SR resources, for example, to report the availability of discovery data. The arrival of the discovery data may trigger an SR, for example, but may not trigger the transmission of a MAC CE (e.g., SL buffer status report (BSR)). In examples, a WTRU may be (pre)configured with SR resources to indicate the availability of discovery data and other data. A WTRU may trigger the transmission of SR and MAC CE (e.g., SL BSR). In examples, a WTRU may be configured with multiple SR resources/configurations for different characteristics of discovery data. A WTRU may select the SR, for example, based on a characteristic of the discovery data to be transmitted. A characteristic of discovery data may be or may include, for example, one or more of the following: a type of discovery (e.g., discovery for relay selection, discovery for relay reselection, non-relay discovery, discovery for WTRU to WTRU relay, discovery for WTRU to NW relay, etc.); a priority/latency associated with the discovery; a periodicity configured for the discovery transmission; the WTRU type (e.g., relay WTRU, remote WTRU); a state of the relay WTRU/remote WTRU (e.g., connected for relaying) and/or the number of remote WTRUs connected to the relay; a size of the discovery message; the RRC state of the WTRU transmitting the discovery data; the relative time between reception of the discovery data and the end of the discovery period; the SL radio link failure (RLF) status at the WTRU at the time of discovery transmission (e.g., whether SL RLF has been triggered and/or recovery is ongoing, the value of a counter, such as HARQ discontinuous transmission (DTX), or a parameter associated with triggering SL RLF); the Uu RLF status of the WTRU (e.g., relay WTRU) at the time of transmission of the discovery message; or the like.

A WTRU may send a MAC CE to indicate the availability of discovery data. A WTRU may trigger the transmission of a discovery MAC CE (e.g., SL BSR) to report the availability of discovery data. In examples, a WTRU may report the discovery MAC CE, e.g., as a part of an SL BSR. A WTRU may be (pre)configured with a dedicated destination ID and/or destination index, for example, to report the availability of discovery data. A WTRU may be (pre)

configured with one or more destinations to report the availability of discovery data. A WTRU may be (pre) configured (e.g., for each configured destination) with one or more logical channels (LCHs) and logical channel groups (LCGs) to report buffer status. In examples, a WTRU may report the availability of discovery data by transmitting an (e.g., explicit) indication in an SL BSR. A WTRU may use one or more fields in a MAC CE to indicate a QoS associated with discovery data (e.g., the latency, priority, and/or data volume) and/or any other characteristic associated with the discovery (e.g., as described herein). In examples, a WTRU may send a MAC CE that may be dedicated for indicating the presence of discovery transmission. A MAC CE may be sent to a network (e.g., via a UL MAC CE) or to another WTRU (e.g., via an SL MAC CE).

A WTRU may determine the values of one or more fields (e.g., each field) in an SL BSR (e.g., an SL BSR associated with discovery data). A WTRU may report the availability of discovery data for transmission in an BSR (e.g., the WTRU may use a separate buffer status report for discovery data). In examples, a WTRU may determine the respective values of one or more of the following fields in an SL BSR associated with discovery data: a destination index, an LCG, or a buffer size.

A WTRU may be (pre)configured with one or more destination indices (e.g., dedicated destination indices) to report the availability of discovery data. Discovery data (e.g., all discovery data) may be reported with a destination index (e.g., a single destination index) in an BSR. A WTRU may be configured with respective destination indices to report discovery data associated with one or more destination IDs (e.g., L2 destination IDs). A WTRU may be (pre-)configured to use one or more bits in a destination index field and/or another field (e.g., an LCG field or a buffer size field) to indicate the availability of discovery data.

A WTRU may be (pre-)configured with an LCG ID (e.g., a dedicated LCG ID). The WTRU may be (pre-)configured to use a number of bits to represent the LCG ID. The WTRU may be (pre-) configured with a priority of the LCG, for example, to determine the order of the buffer status for discovery data. A WTRU may refrain from including a destination index in a buffer status report. A WTRU may use a destination index to report other information or to report the destination index associated with an L2 destination ID that may be associated with a discovery message. A WTRU may be (pre-)configured to refrain from including LCG information in a buffer status report. The bits in an LCG field (e.g., all or a subset of the bits in an LCG field) may be used to indicate other information such as a buffer size.

A WTRU may be (pre-)configured to use a number of bits to indicate its buffer size. The value of the buffer size may indicate the number of discovery messages (e.g., if the size of a discovery message is fixed).

Figure 4:
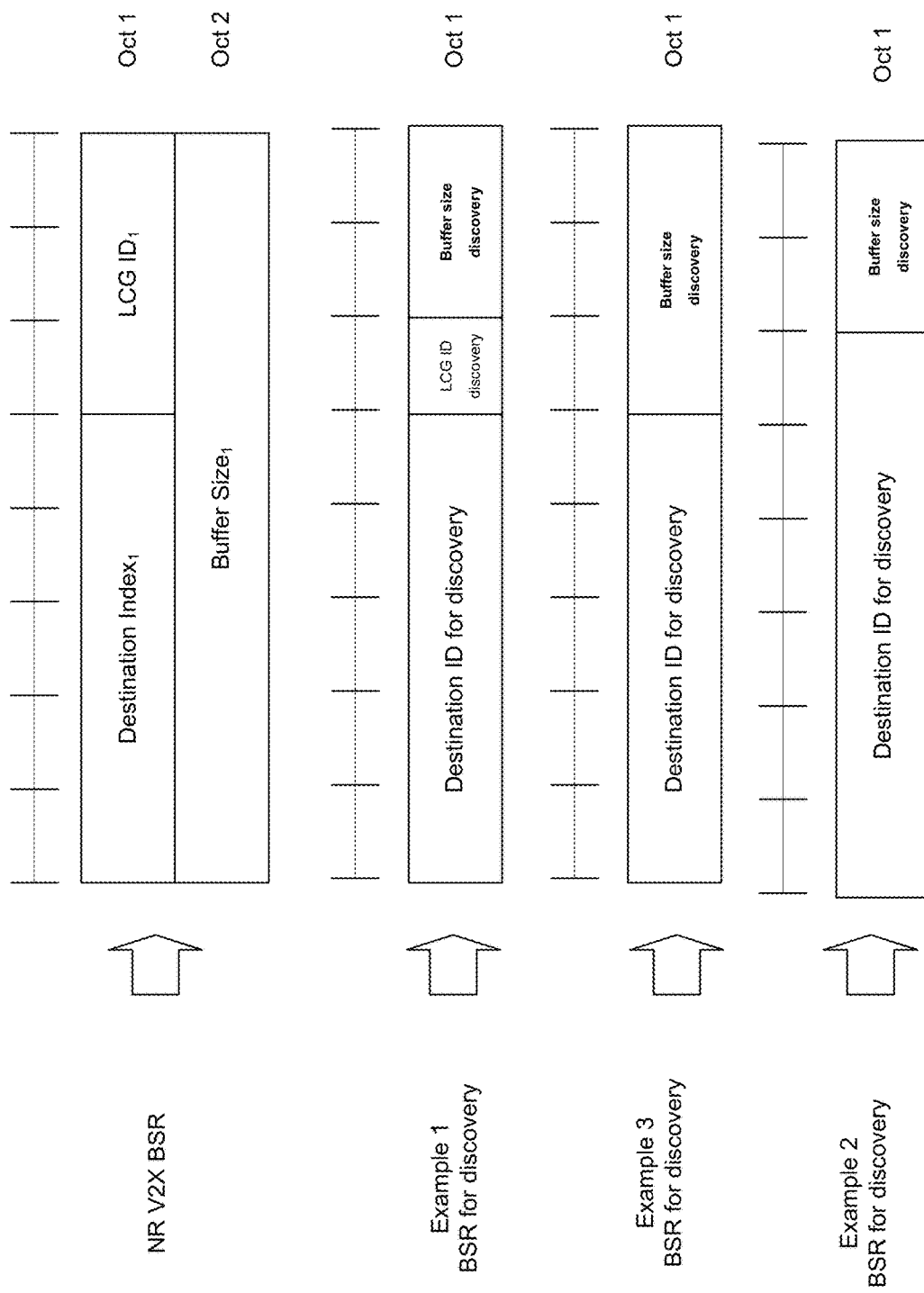
FIG. 4 illustrates an example of a BSR associated with discovery data.

FIG. 4 shows examples of bit allocation for an SL or V2X BSR, where Oct may indicate Octet. The x-axis, as shown in FIG. 4, may indicate bits. In the first example, a WTRU may use 1 bit to indicate an LCG and 2 bits to indicate a buffer size. In the second example, a WTRU may use 3 bits to indicate a buffer size and no bits to indicate an LCG ID. A WTRU may use 5 bits to indicate a (pre-)configured destination index, for instance, in the first and/or the second example. In the third example, a WTRU may use 6 bits to indicate a destination index, 2 bits to indicate a buffer size, and no bits to indicate an LCG ID. A WTRU may indicate the fields described herein using other bit allocation schemes. The buffer status associated with a discovery message may have a different size (e.g., different number of bits) than the buffer status associated with normal data (e.g., a buffer status that does not include discovery message information), for example, as shown herein.

A WTRU may indicate the amount of discovery data (e.g., in bytes) to be transmitted in a BSR, for example, if one or more discovery transmissions are available at the WTRU. A WTRU may encode the buffer size field associated with discovery transmission, for example, into a sequence of values (e.g., each value may be associated with the size range of a discovery message). For example, the WTRU may be configured to use 2 bits to transmit the buffer size of discovery data. The WTRU may transmit bit values of '01' for small discovery data (e.g., for a buffer size of between 0 and x bytes, where x may be configured), '10' for medium discovery data (e.g., for a buffer size of between x and y bytes), and '11' for large discovery data (e.g., for a buffer size of between y bytes and z bytes), where $x<y<z$.

A WTRU may determine the order in which destination(s) are to be reported (e.g., the order for transmitting BSRs for those destinations). The WTRU may determine the order of BSRs for discovery data based on a (pre-)configured priority of an LCG associated with a discovery related BSR. The WTRU may be (pre-)configured with a priority level for a discovery related BSR. The WTRU may include (e.g., transmit) a BSR of discovery data and/or other data according to the respective priorities (e.g., configured priorities) of the LCGs associated with those BSRs. The WTRU may prioritize a BSR for discovery data, for example, over other SL BSR and/or UL BSR.

A WTRU may use a MAC sub-header to indicate the availability of discovery data. The WTRU may use one or more bits in the MAC sub-header to indicate the availability of discovery data. For example, the WTRU may use one or more bits in a V field (e.g., a field indicating the version of SL-SCH) and/or one or more bits in an R field (e.g., a reserved field) of the SL-SCH MAC sub-header, for example, to indicate the availability and/or the amount of discovery data. The WTRU may use 2 bits in the V field to indicate the buffer status of discovery data, in which a (e.g., each) value of 2 bits may indicate the number of discovery data messages. The WTRU may use, for example, "01," "10," and "11" to indicate 1, 2, and 3 discovery messages to be transmitted, respectively. The WTRU may indicate the availability of data, for example, if the WTRU transmits an SL-SCH MAC sub-header.

A WTRU may be configured with an LCP restriction for LCH containing discovery data. In examples, the WTRU may be configured (e.g., preconfigured) with one or multiple destination IDs for discovery transmission. The WTRU may be configured with an LCP restriction for transmission of discovery, for example, associated with data. For example, the WTRU may not be allowed to multiplex discovery with data in the same PDU. For example, the WTRU, based on selection of an LCH associated with data may refrain from selecting an LCH associated with discovery to include in the same PDU. Based on the selection of an LCH associated with discovery, the WTRU may refrain from selecting an LCH associated with data to include in the same PDU.

A WTRU may be configured with conditions associated with restriction application. For example, whether to apply such conditions may depend on a CBR of a resource pool; the allowable transmit power for a PDU or a condition associated with the transmit power; the size of the SL grant; and/or the priority of data in the discovery LCH or the data LCH, or the relative priorities of data in the discovery LCH and data LCH.

The WTRU may be configured with restriction application conditions depending on, for example, a CBR of a resource pool. For example, the WTRU may apply such restriction if the CBR of the shared resource pool is above a threshold.

The WTRU may be configured with restriction application conditions depending on, for example, the allowable transmit power for a PDU or a condition associated with the transmit power. For example, the WTRU may apply an LCP restriction if the transmission power is limited by some factor (e.g. based on an open loop calculation, or based on Uu RSRP)

The WTRU may be configured with restriction application conditions depending on, for example, the size of the SL grant. The size of the SL grant may be relative to the amount of data to be transmitted, for example, from either or both of the discovery LCH and data LCH. For example, if the size of the grant is below a threshold, the WTRU may apply such restriction. For example, if the difference between the size of the grant and the data in either discovery LCH or data LCH is below a threshold, the WTRU may apply such restriction.

The WTRU may be configured with restriction application conditions depending on, for example, the priority of either data in the discovery LCH or the data LCH, or the relative priorities of data in the discovery LCH and data LCH. For example, if the priority of the discovery or data LCH is above (e.g., or below) a threshold, the WTRU may apply such restriction. For example, if the difference in priority between discovery and data is larger than a threshold, the WTRU may apply such restriction.

The WTRU may receive an indication from a network node (e.g., gNB) indicating whether the scheduled sidelink grant is for discovery data. In examples, the WTRU may determine whether discovery may be transmitted in the grant. The WTRU may perform LCP restriction, for example, based on the indication of the grant from the network. If the network indicates that the grant may be used for discovery transmission, the WTRU may refrain from restricting multiplex discovery in the TB for possible transmission in the grant. If the network indicates that the grant may not be used for discovery transmission, the WTRU may perform LCP restriction to refrain from including discovery LCH in the grant. In examples, the WTRU may determine whether the grant is for discovery (e.g., is for discovery only). If the grant is for discovery, the WTRU may use the grant for discovery transmission (e.g., use the grant for discovery transmission only). If the grant may be used for transmissions other than discovery (e.g., the grant is not for discovery only), the WTRU may use the grant for other sidelink data transmissions.

The WTRU may be scheduled with a sidelink grant and a PUCCH resource, for example, for Uu HARQ feedback. The WTRU may use the scheduled sidelink grant, for example, for discovery transmission. The WTRU may be configured (e.g., preconfigured) with a number of transmissions (e.g., a maximum and/or minimum number of transmissions) for a discovery TB. The minimum and maximum number of transmissions for a discovery TB may be equal. The WTRU may determine to request more resources for a discovery transmission, for example, based on the number of the transmissions the WTRU has performed for transmission of one discovery TB. If the number of transmissions is within the configured (e.g., preconfigured) range, the WTRU may refrain from requesting more resources for discovery transmission. Otherwise, the WTRU may request more resources for discovery transmission. The WTRU may transmit an ACK in a PUCCH transmission to indicate that the WTRU refrains from requesting more resources, and the WTRU may transmit a NACK to indicate that the WTRU requests more resource.

The WTRU may perform LCP restriction, for example, to determine whether to multiplex discovery in a TB for transmission in a sidelink grant. The WTRU may perform LCP restriction on the LCH for discovery transmission, for example, based on one or any combination of the following properties of the sidelink resource: the size of the sidelink grant, the number of (re)transmission resources in a grant, and/or the frequency diversity of the grant.

The WTRU may perform LCP restriction, for example, based on the size of the grant. If the size of the grant is greater than a threshold, the WTRU may refrain from multiplexing discovery LCH for transmission of the discovery TB in the grant. If the size of the grant is smaller than a threshold or equal to a threshold, the WTRU may multiplex discovery in the TB for potential discovery transmission in the sidelink grant. The sidelink grant size threshold may be fixed (e.g., 1 subchannel) or it may be configured (e.g., preconfigured). For example, the WTRU may be configured (e.g., preconfigured) to use a subchannel (e.g., a maximum of one subchannel) for discovery transmission. The WTRU may determine whether to multiplex discovery in a TB for transmission in a sidelink grant, based on the size of the grant. If the size of the grant is one subchannel, the WTRU may multiplex discovery in the TB. If the size of the grant is greater than one subchannel, the WTRU may refrain from multiplexing discovery in the TB for transmission in the grant. In examples, the WTRU may be configured (e.g., preconfigured) with a sidelink size (e.g., one or multiple sidelink sizes) to transmit discovery in the grant. Each size may be associated with one resource pool, discovery service, etc. The WTRU may determine whether to multiplex discovery in the TB for discovery transmission based on the size of the grant. If the size of the grant belongs to one of the configured (e.g., preconfigured) sizes, the WTRU may multiplex discovery in the TB for transmission in the grant. Otherwise, the WTRU may refrain from multiplexing discovery in the TB.

The WTRU may perform LCP restriction, for example, based on the number of (re)transmission resources in a grant. For example, the WTRU may be configured (e.g., preconfigured) with a number of transmission resources (e.g., a minimum and/or maximum number of transmission resources) in the grant for discovery transmission. The WTRU may determine whether to multiplex discovery in a TB for possible transmission in a sidelink grant based on the number of (re)transmission resources associated with the grant. If the number of (re)transmission resources associated with the grant is within the configured (e.g., preconfigured) number of transmission resources, the WTRU may multiplex discovery data in the TB for discovery transmission. Otherwise, the WTRU may refrain from multiplexing discovery data in the TB.

The WRTU may perform LCP restriction, for example, based on the frequency diversity of the grant. For example, the WTRU may be configured (e.g., preconfigured) with one or any combination of the following frequency diversity rules for transmission resources of a discovery TB: the frequency gap between transmission resources (e.g., two transmission resources) or consecutive transmission resources (e.g., two consecutive transmission resources) is greater than a threshold, and/or the frequency range of transmission resources (e.g., two, more than two, or all transmission resources) is greater than a threshold. The WTRU may determine whether to multiplex discovery data in the sidelink grant based on whether the sidelink grant satisfies one or any combinations of the frequency diversity rules (e.g., as described herein). If the sidelink grant satisfies the frequency diversity rules, the WTRU may multiplex discovery data in the TB, otherwise, the WTRU may refrain from multiplexing discovery data in the TB.

A WTRU may send an RRC message (e.g., WTRU/UE assistance information (UAI)) to indicate a change in the traffic of discovery data. A WTRU may be scheduled with one or more configured grants (CGs) to transmit discovery messages. A WTRU may (e.g., based on a change in the traffic of discovery data) send an RRC message (e.g., WTRU/UEAssistantInformation or UAI) to indicate a change in the traffic of discovery data. A WTRU may send the RRC message, for example, based on at least one of the following triggers: the availability of discovery data; a change in the periodicity and/or offset of discovery data; a change in the QoS of discovery data; a change in the size of discovery data; a change in the characteristics of discovery data (e.g., as described herein); and/or the like. A WTRU may implicitly or explicitly include one or more (e.g., any combination) of the following in an RRC message associated with discovery data: the latency of the discovery data; the expected periodicity of the discovery data; the expected offset of the discovery resource; and/or the like.

A WTRU may determine which data may be multiplexed with discovery data. In examples, a WTRU may be (pre) configured with one or more destinations for discovery data. A WTRU may multiplex discovery data with other data, for example, based on reception of the other data, e.g., having a destination belonging to a set of the (pre)configured data. In examples, a WTRU may receive configuration information (e.g., LCH configuration information) indicating whether a specific LCH allows multiplexing of data from the LCH with discovery data. A WTRU performing SL logical channel prioritization (LCP) may multiplex data (e.g., only) from allowed LCHs with discovery data. The allowed LCHs may be indicated (e.g., to be allowed or not allowed to multiplex with discovery data) in the SL LCH configuration information.

A WTRU may receive a grant dedicated/prioritized for discovery transmission. In examples, a WTRU may receive a grant dedicated for transmission of discovery data and the WTRU may transmit (e.g., only) discovery data within the grant. In examples, a WTRU may receive a grant for which discovery data may be prioritized. A WTRU may multiplex (e.g., using LCP) discovery data with a higher priority compared to non-discovery data in the grant. A WTRU may determine the priority of discovery data in LCP, for example, depending on whether the grant is prioritized for discovery data. A WTRU may receive a prioritization indication, for example, in the DCI associated with the SL grant, or in the RRC configuration information of a configured sidelink grant.

A WTRU may determine the priority of discovery data in LCP. A WTRU may determine the priority of discovery data for transmission (e.g., in an LCP procedure), for example, based on one or more of the following: the characteristics of the discovery data (e.g., as described herein); the LCH (e.g., and associated configuration information associated with discovery data); the sidelink channel measurements at the time of transmission (e.g., CBR, CR, and/or sensing results); the presence of additional SL grants (e.g., configured grants) at the time of transmission; the time gap between arrival time of the discovery data and the timing of the selected resource for transmission; the remaining PDB of the message; or the discovery models.

A WTRU may determine the priority of discovery data for transmission based on the time gap between arrival time of the discovery data and the timing of the selected resource for transmission. The WTRU may determine the priority of the discovery message as a function of the time gap between the arrival time of the discovery message and the selected resource. In examples, the WTRU may assign a high priority if the time gap is large. In examples, the WTRU may assign a low priority if the time gap is small.

A WTRU may determine the priority of discovery data for transmission based on the remaining packet delay budget (PDB) of the message. The WTRU may assign a high priority for a TB having low remaining PDB. The WTRU may assign a low priority for a TB having high remaining PDB. The remaining PDB may be determined as the time gap between the selected resource and the last slot the WTRU can transmit the TB.

A WTRU may determine the priority of discovery data for transmission based on one or more discovery models. The WTRU may receive configuration information for multiple priority levels (e.g., two or more priority levels) associated with the discovery message. A first priority level may be associated with a first discovery message model (e.g., model A discovery message). A second priority level may be associated with a second discovery message model (e.g., model B discovery message). The WTRU may determine the priority of the discovery message based on which discovery model is used.

In examples, a WTRU may assign a higher priority to discovery data in LCP, for example, if the discovery data is associated with a WTRU for which SL RLF was triggered and/or recovery is ongoing. A WTRU may be assigned (e.g., based on configuration information) a first priority associated with discovery and may change to a second priority associated with discovery, for example, if discovery is associated with one or more (pre)configured or predefined characteristics.

A WTRU may determine a QoS of discovery data. A WTRU may be (pre)configured with one or more LCHs for discovery data. A (e.g., each) LCH may be associated with one or more of the following parameters: a range of priority, a latency, a reliability, a minimum communication range, and/or a discovery period. A WTRU may be indicated (e.g., receive an indication of) one or more (e.g., any combination of) the parameters, for example, from upper layers. A minimum communication range may be indicated, for example, via transmission power, minimum transmission power, and/or maximum transmission power.

A WTRU may determine a QoS of a discovery message. A WTRU may determine, for example, one or more (e.g., any combination) of the following QoS parameters that may be associated with the discovery message: the priority of the message; the latency of the message; the reliability of the message; the minimum communication range of the message; the discovery period associated with the message; and/or the like. A WTRU may determine a (e.g., each) parameter based on the type of data multiplexed in a message. The QoS parameters may be determined, for example, as the minimum, maximum, or average value of a (e.g., each) type of data multiplexed in the message.

A WTRU may select a resource pool to transmit discovery data. A WTRU may select a resource pool to transmit discovery data, for example, based on one or more (e.g., any combination) of the following: a QoS of the discovery data; the supported periodicity of the resource pool; the resource selection type of the resource pool; the CBR of the resource pool; and/or the CR of the WTRU. For example, a WTRU may select the resource pool having the lowest CR (e.g., in combination with other criteria).

In examples, a WTRU may be (pre)configured with a dedicated resource pool for transmission of a discovery message. A discovery message may belong to one or more (e.g., any) of the following messages: a discovery message having (e.g., only) discovery data; and/or a discovery message having discovery data and other data.

In examples, a WTRU may select a resource pool satisfying the QoS of the discovery data. A WTRU may determine the latency, priority, reliability, minimum communication range, periodicity of the discovery data; and/or other parameters, for example, associated with the discovery data. A WTRU may select one or more resource pools satisfying one or more (e.g., any determinable, selectable, configurable or indicated) combination of the parameters. For example, a WTRU may select a resource pool having a discovery period smaller than the latency and/or discovery period of the data. A WTRU may select a resource pool with the lowest supported periodicity.

In examples, a WTRU may select a resource pool supporting random resource selection or sensing-based resource selection, for example, based on the QoS of the discovery data. A WTRU may select a resource pool with random resource selection, for example, if a priority value of the discovery data is larger than a threshold. A WTRU may select a resource with sensing-based resource selection for the discovery data having priority value being smaller than a threshold. A threshold may be (pre)configured, for example, per service or per resource pool. A WTRU may select the resource pool having the lowest CBR.

A WTRU may perform prioritization between discovery transmission/reception and other sidelink and/or uplink transmission/reception. A WTRU may perform prioritization between discovery transmission/reception and other sidelink and/or uplink transmission/reception, for example, based on one or more (e.g., any combination) of the following: the priority of discovery transmission/reception and/or the priority of other data transmission/reception; a sidelink condition; a coverage status of the WTRU; the availability of a relay; a characteristic of the discovery data (e.g., as described herein); and/or the like.

A WTRU may perform prioritization, for example, based on the priority of discovery transmission/reception and/or the priority of other data transmission/reception. A WTRU may determine which data to perform resource selection/transmission/reception first, for example, based on the priority of the associated data. A WTRU may be (e.g., further) configured to determine whether to prioritize discovery data, for example, for data having the same priority. A WTRU may prioritize the discovery data, for example, if the priority value of the discovery data is below (e.g., less than or smaller than) a threshold. The WTRU may prioritize other data, for example, if the priority value of the discovery data is above (e.g., greater than or larger than) a threshold.

A WTRU may perform prioritization, for example, based on a sidelink condition. A WTRU may prioritize discovery transmission/reception, for example, based on a sidelink condition between the WTRU and another WTRU (e.g., relay WTRU, source WTRU, or destination WTRU). A WTRU may prioritize data transmission, for example, if the sidelink between the WTRU and other WTRU is in good condition (e.g., RSRP is greater than a threshold, RLF has not been detected, the distance between the two WTRUs is smaller than a threshold, etc.). A WTRU may prioritize discovery data transmission/reception, for example, if the sidelink transmission between the WTRU and other WTRU is in a bad condition based on one or more bad conditions (e.g., RSRP is smaller than a threshold, RLF has been detected, the distance between two WTRU is greater than a threshold, and/or the like).

A WTRU may perform prioritization, for example, based on the coverage status of the WTRU. A WTRU may prioritize discovery transmission, for example, if the WTRU is in the network coverage. A WTRU may prioritize discovery reception, for example, if the WTRU is out of network coverage.

A WTRU may perform prioritization, for example, based on the availability of a relay. A WTRU may prioritize discovery data transmission/reception, for example, if the WTRU does not have an existing relay. A WTRU may prioritize other data transmission/reception, for example, if the WTRU has a connection with a relay.

A WTRU may perform prioritization, for example, based on a characteristic of the discovery data (e.g., as described herein). A WTRU may prioritize discovery transmission over data transmission, for example, if a latency associated with the discovery data relative to the end of the discovery period is above/below a threshold. A WTRU may prioritize discovery transmission/reception over data transmission, for example, if the WTRU has a pending SL-RLF or is performing recovery.

A WTRU may perform autonomous procedures. A WTRU may (e.g., autonomously) determine discovery transmission contents and/or parameters (e.g., transmission behaviors). A WTRU may determine the transmission contents and/or parameters of a message. The transmission contents and/or parameters of a TB (e.g., discovery message) may include, for example, one or more (e.g., any combination) of the following: a transmission probability of a (e.g., discovery) message (e.g., the probability with which a WTRU transmits a pending discovery message in a given period or resource); a sensing and/or resource selection time of the message; the number of retransmissions; the number of subchannels (e.g., used for transmission of the TB); a modulation and coding scheme (MCS); the transmission power; the DMRS pattern of the PSSCH; the sensing window and/or resource selection window; the resource pool used for transmission of the message; and/or the like.

A WTRU may determine the transmission contents and/or parameters of a TB, for example, based on one or more (e.g., any combination) of the following: the types of data multiplexed in the TB; the arriving time of the discovery data within the discovery period; the QoS of the message (e.g., discovery message); the CBR of the resource pool and/or CR of the WTRU (e.g., WTRU may determine that the transmission behavior of discovery data, such as transmission parameters, is not a function of CBR and/or CR); the past transmission activity of the WTRU; the characteristics of the discovery data (e.g., as described herein); and/or the like.

A WTRU may determine the types of data multiplexed in the TB. A WTRU may determine the transmission contents and/or parameters of a message (e.g., discovery message), for example, based on the types of data multiplexed in the message. A WTRU may be (pre)configured with one or more transmission contents and/or parameters. A (e.g., each) transmission contents and/or parameters may be associated with a (e.g., one) type of TB. A WTRU may determine the transmission contents and/or parameters based on the type of TB. For example, a WTRU may be (pre)configured with three transmission behaviors (e.g., contents and/or behaviors) for three types of TB. The WTRU may perform the first transmission behavior for the TB without discovery data.

The WTRU may perform the second transmission behavior for the TB having discovery data and other data (e.g., regular data). The WTRU may perform the third transmission behavior for the TB having only discovery data.

A WTRU may determine a resource pool to transmit a message (e.g., a resource pool from which resource(s) may be used to transmit the message). A WTRU may determine a resource pool to transmit a message, for example, based on the types of data multiplexed in the message. For example, a WTRU may be (pre)configured with two sets of resource pools. One of the resource pool(s) may be dedicated to the discovery message, and the other resource pool(s) may be dedicated to a data message. The WTRU may transmit the message in the first resource pool(s), for example, if the message has discovery data. The WTRU may transmit the message in the second resource pool(s), for example, if the message does not have discovery data.

A WTRU may determine the transmission probability of a discovery message. A WTRU may perform a procedure (e.g., the following procedure) to transmit a message with a certain probability. For example, a WTRU may (e.g., first) randomly generate a value between 0 and 1. The WTRU may transmit the message, for example, if the generated value is smaller than a (pre)configured probability. The WTRU may drop the message, for example, if the generated value is equal to or larger than a (pre)configured probability.

A WTRU may determine the transmission probability of a message (e.g., discovery message), for example, based on an associated QoS of the discovery message (e.g., the priority, the latency, the minimum communication range, and/or the discovery period). For example, a WTRU may be (pre)configured with a (e.g., each) priority of the discovery message and a (e.g., each) transmission probability. The WTRU may determine the priority of the discovery data and the associated transmission probability, for example, based on (e.g., upon the arrival of) discovery data (e.g., from signaling from upper layers). The WTRU may perform transmission of the discovery message according to the associated probability. A WTRU may refrain from applying the transmission probability if the discovery message includes both discovery data and other data.

A WTRU may determine the transmission power of a discovery message. A WTRU may be (pre)configured with parameters (e.g., multiple sets of parameters) to determine the transmission power of a message, for example, in a resource pool. A (e.g., each) set of parameters may be associated with a (e.g., one) type of data. A (e.g., each) set of parameters may include one or more (e.g., any combination) of the following: a power offset and alpha value; the maximum transmission powers; and/or the like.

A WTRU may determine a transmission power for a message based on the type of data multiplexed in the message. For example, a WTRU may be (pre)configured with multiple (e.g., two) sets of parameters to determine the transmission power of a message in a resource pool. The first set may be associated with discovery data, and the second set may be associated with other data. The WTRU may determine the transmission power of the message, for example, based on the type of data multiplexed in the message. The WTRU may use the first set of parameters to determine the transmission data, for example, if the message has discovery data. The WTRU may combine two sets of parameters to determine the transmission power, or may use the second set of parameters, for example, if the message (e.g., a discovery message) includes discovery data and other data.

A WTRU may determine transmission contents and/or parameters based on the arrival time of discovery data. A WTRU may determine the transmission contents and/or parameters of a message (e.g., discovery message) based on the arrival time of the message. A WTRU may determine (e.g., for discovery data arriving in a discovery period, where the discovery period may be a current discovery period as used herein) whether to perform resource selection for a discovery message in the discovery period, in the next period (e.g., a consecutive or subsequent discovery period occurring after the discovery period), or in both periods, for example, based on one or more (e.g., any combination) of the following: a time gap between the discovery data arrival time and the end of the discovery period; a QoS of the discovery period; and/or the like.

A WTRU may determine whether to perform resource selection for a discovery message in the discovery period and/or in the next period, for example, based on a time gap between the discovery data arrival time and the end of the discovery period. A WTRU may perform resource selection in the next period, for example, if the time gap between the arrival time and the end of the discovery period is smaller than a threshold. The WTRU may perform resource selection in the discovery period and/or in both the discovery period and the next discovery period, for example, if the time gap between the arrival time and the end of the discovery period is equal to or larger than the threshold.

A WTRU may determine whether to perform resource selection for a discovery message in the discovery period and/or in the next period, for example, based on the QoS of the discovery period. A WTRU may perform resource selection for a discovery message transmission in the discovery period and/or in both the discovery period and the next discovery period, for example, if the latency of the discovery is smaller than a threshold. The WTRU may perform resource selection for the transmission of the discovery data in the next discovery period, for example, if the latency of the discovery is equal to or larger than the threshold.

A WTRU may determine transmission contents and/or parameters based on a QoS of a message. A WTRU may determine the transmission contents and/or parameters of a message (e.g., discovery message), for example, based on the QoS of the data (e.g., priority and/or latency) and/or the QoS of the discovery data. A WTRU may not (e.g., not be allowed to) perform transmission of discovery data without multiplexing with other data, for example, if the priority of the discovery data is larger than a threshold. A WTRU may not be allowed to trigger sensing and/or resource selection of discovery data, for example, if the priority of the data is larger than a threshold. A threshold may be (pre)configured, e.g., per resource pool or per service. A WTRU may determine a transmission probability of discovery data as a function of the priority of the discovery data.

A WTRU may determine transmission contents and/or parameters based on a CBR of the resource pool and/or a CR of the WTRU. A WTRU may determine transmission contents and/or parameters of a message (e.g., discovery message), for example, based on a CBR of the resource pool and/or a CR of the WTRU. For example, a WTRU may be (pre)configured with one or multiple transmission behaviors (e.g., contents and/or parameters) of a discovery message. A (e.g., each) behavior may be associated with a (e.g., one) CBR range and/or a (e.g., one) CR range. A WTRU may not (e.g., not be allowed to) perform transmission of a discovery message without multiplexing with data, for example, if the CBR and/or CR is greater than a threshold. A WTRU may determine the transmission probability of a discovery message, for example, based on a CBR of the resource pool and/or a CR of the WTRU. A WTRU may be (pre)configured with a transmission probability of a discovery message, for example, for a (e.g., each) CBR range.

A WTRU may determine transmission contents and/or parameters based on past transmission contents and/or parameters of the WTRU. A WTRU may determine the transmission contents and/or parameters of a discovery message (e.g., current discovery message) based on past transmission contents and/or parameters of the WTRU (e.g., transmission contents and/or parameters associated with the discovery data). A WTRU may modify the transmission probability of the discovery data in the period, for example, based on the WTRU's transmission activity of the discovery data in the last period. A WTRU may increase a transmission probability of discovery data in the period (e.g., the WTRU may transmit the discovery data with a probability of one), for example, if the WTRU did not transmit the discovery data in the last discovery period or in the last several discovery periods. This approach or similar approaches based on transmission contents and/or parameters history may support transmitting at least one discovery message within a certain time.

A WTRU may determine transmission contents and/or parameters based on one or more characteristics of a message (e.g., discovery message). A WTRU may determine transmission contents and/or parameters of a message (e.g., discovery message), for example, based on one or more characteristics of the message (e.g., discovery message), e.g., as defined herein. A WTRU may perform resource selection with a first resource selection window, for example, if a discovery message is received during a pending RLF, and a second resource selection window, for example, if the discovery message is received without a pending RLF.

Figure 5:
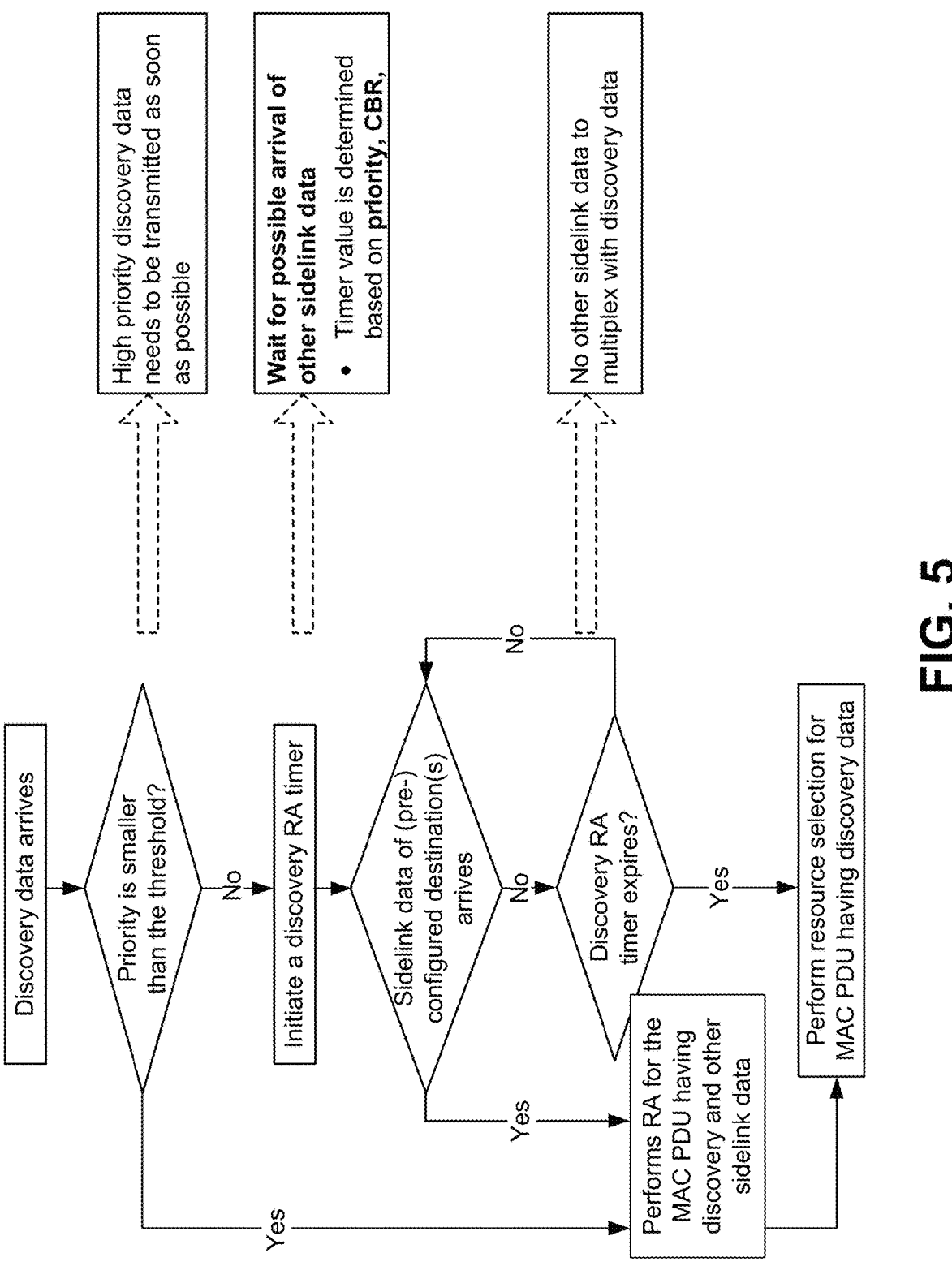
FIG. 5 illustrates an example resource allocation for discovery data using a discovery resource allocation time.

Resource allocation may be time-based resource allocation (e.g., timer-based resource allocation). FIG. 5 illustrates an example resource allocation for discovery data using a discovery resource allocation time. A WTRU may determine the sensing and/or resource selection timing of a message. A WTRU may perform sensing and/or resource selection, for example, based on the arrival of a message (e.g., discovery message), for example, as shown in FIG. 5. A WTRU may track a duration of time (e.g., via a timer, which the WTRU may initiate) to determine the sensing and/or resource selection timing of the message. A WTRU may (e.g., based on the duration of time expiring and/or expiry of the timer) trigger sensing and/or resource selection for the message. A WTRU may determine whether to track a discovery resource selection time (e.g., via a discovery resource selection timer, which the WTRU may initiate), for example, based on one or more (e.g., any combination) of the following: the QoS of the discovery data (e.g., the priority and/or the latency of the discovery data); the discovery periods and/or the arrival time of the discovery data; the CBR of the resource pool; the buffer status of the WTRU and/or CR of the WTRU; the availability of the sensing result; the availability of reserved resources; the characteristics of the discovery message (e.g., as defined herein); and/or the like.

A WTRU may determine whether to track a discovery resource selection time (e.g., via a discovery resource selection timer), for example, based on the QoS of the discovery data (e.g., the priority and/or the latency of the discovery data). A WTRU may track a discovery resource selection time (e.g., via a timer), for example, if the priority of the discovery timer is greater than a threshold (e.g., as shown in FIG. 5). The WTRU may skip tracking the discovery resource selection time (e.g., via the timer), for example, if the priority of the discovery timer is less than or equal to the threshold (e.g., as shown in FIG. 5). A priority threshold may be (pre)configured, e.g., per resource pool or per service.

A WTRU may determine whether to track a discovery resource selection time (e.g., via a discovery resource selection timer), for example, based on the discovery periods and/or the arrival time of the discovery data. A WTRU may track a discovery resource selection time (e.g., via a discovery resource allocation timer), for example, if the discovery period is larger than a threshold. A WTRU discovery period may be derived from an LCH of the discovery data. A WTRU may track a discovery resource selection time (e.g., via a discovery resource selection timer), for example, if the discovery period is larger than a threshold and/or the time gap between the arrival time of the discovery data and the last slot of the discovery period is larger than a threshold. A discovery period may be (pre)configured per resource pool.

A WTRU may determine whether to track a discovery resource selection time (e.g., via a discovery resource selection timer), for example, based on the CBR of the resource pool. A WTRU may track a discovery resource selection time (e.g., via a discovery resource allocation timer), for example, if the CBR of the resource pool is greater than a threshold. A threshold may be (pre)configured, e.g., per resource pool or per service. A WTRU may be (pre-)configured with a CBR threshold, for example, as a function of a QoS of the discovery data (e.g., priority and/or latency). A WTRU may be (pre)configured with multiple CBR thresholds, for example, to track a discovery resource selection time (e.g., via a discovery resource selection timer). A (e.g., each) threshold may be associated with a (e.g., one) priority and/or a (e.g., one) latency range of the discovery data.

A WTRU may determine whether to track a discovery resource selection time (e.g., via a discovery resource selection timer), for example, based on the buffer status of the WTRU and/or CR of the WTRU. A WTRU may track a second time (e.g., via a second timer), for example, if there is no data associated with a (pre-)configured set of destination available at the buffer. The WTRU may track a discovery resource selection time (e.g., via the discovery resource selection timer), for example, if there is data associated with the (pre-)configured destination, for example, available at the buffer. The WTRU may track a discovery resource selection time (e.g., via a discovery resource selection timer), for example, if the WTRU has data associated with a certain LCH(s) possibly having a higher priority than the discovery data. The WTRU may track a discovery resource selection time (e.g., via a discovery resource selection timer), for example, if the CR of the WTRU is higher than a threshold.

A WTRU may determine whether to track a discovery resource selection time (e.g., via a discovery resource selection timer), for example, based on the availability of the sensing result. For example, a WTRU may be (pre-)configured with a number of sensing slots (e.g., minimum number of sensing slots), e.g., before performing resource selection. The WTRU may track a discovery resource selection time (e.g., via a discovery resource selection timer), for example, if the number of sensing slots is smaller than a threshold.

A WTRU may determine whether to track a discovery resource selection time (e.g., via a discovery resource selection timer), for example, based on the availability of reserved resources. A WTRU may use reserved resources to transmit the discovery message, for example, if they satisfy one or more (e.g., any combination) of the following conditions: the timing of the reserved resources satisfies the latency requirement of the discovery data; the number of reserved resources satisfy the reliability requirement of the discovery message (e.g., the number of reserved resource is greater than a threshold); and/or the number of reserved subchannels is greater than a first threshold and/or smaller than a second threshold. For example, a WTRU may be configured to use (e.g., one) subchannel resources to transmit a discovery message. A WTRU may refrain from tracking a discovery resource selection time (e.g., via a discovery resource selection timer), for example, if a (e.g., one) subchannel resource has been reserved before.

A WTRU may determine an initial value of a discovery resource selection time (e.g., as shown in FIG. 5). An initial value of a time may be determined, for example, as a function of one or more (e.g., any combination) of the following parameters: the QoS of discovery data (e.g., the priority, as shown in FIG. 5, and/or the latency of the discovery data); the discovery periods and/or arrival time of discovery data; the CBR of the resource pool (e.g., as shown in FIG. 5) and/or the CR of the WTRU; the characteristics of the discovery message (e.g., as defined herein); and/or the like. A WTRU may be configured with a minimum and/or a maximum value of a discovery resource allocation time. Minimum and/or maximum bounds may be (pre)configured, for example, based on one or more (e.g., any combination) of the parameters. A WTRU may determine an initial value of sensing and/or resource selection, for example, by randomly selecting a value within the minimum and maximum (pre)configured values.

A WTRU may determine which data to multiplex with discovery data. A WTRU may (e.g., decide/determine to) multiplex discovery data with other data, for example, based on one or more (e.g., any combination) of the following: the destination of the other data (e.g., as shown in FIG. 5); the QoS of the other data; the QoS of the discovery data; and/or the like. A WTRU may be (pre)configured with one or multiple destinations to multiplex discovery data, for example, with data having a destination that belongs to the set of (pre)configured destinations.

A WTRU may perform sensing and/or resource selection, for example, upon expiry of a discovery resource selection time (e.g., via a discovery resource selection timer), e.g., as shown in FIG. 5. A WTRU may perform sensing and/or resource selection for a discovery message, for example, based on expiry of a discovery resource selection time (e.g., via a discovery resource selection timer). A WTRU may construct a MAC PDU with the discovery data, for example, (e.g., only) if there is no data available that belongs to a set of (pre)configured destinations at the buffer, e.g., as shown in FIG. 5. The WTRU may multiplex the discovery data with the other data, for example, if there is data available that belongs to a set of (pre)configured destinations at the buffer, e.g., as shown in FIG. 5.

A WTRU may apply time and/or frequency restrictions among selected resources for a discovery message. A WTRU may select resources for a (e.g., each) transmission of a TB, for example, so that the time and/or frequency between two selected resources may be greater than a first threshold and/or smaller than a second threshold. A time/frequency threshold may be (pre)configured, e.g., per resource pool and/or per service. A WTRU may apply time and/or frequency restrictions, for example, during a resource selection procedure. A WTRU may (e.g., before selecting the next resource) exclude (e.g., all) resources in the set of selectable resources, for example, if the time and/or frequency gap between the previously selected resource is smaller than a first threshold and/or greater than a second threshold. A WTRU may select resources, for example, so that the time gap and/or frequency gap between two consecutive resources is fixed.

In examples, the WTRU may perform resource selection, for example, for transmission of one or multiple TBs. The WTRU may select the transmission resources such that the frequency range between two selected resources in one window is greater than a first frequency range threshold and/or smaller than a second frequency range threshold. The WTRU may select the transmission resources such that the time gap between two selected resources (e.g., time gap between consecutively selected resources, time gap between any two selected resources for a TB, etc.) is greater than a first time gap threshold and/or smaller than a second time gap threshold. The time gap threshold(s) and/or frequency range threshold(s) may be configured (e.g., preconfigured) for a resource pool. The WTRU may be configured (e.g., preconfigured) with multiple time gap thresholds and/or frequency range thresholds. A threshold (e.g., each threshold) may be associated with one or any combination of the following: the QoS of the TB, the CBR of the resource pool, the HARQ type of the TB, and/or the traffic type of the TB.

A threshold may be associated with the QoS of the TB. For example, the WTRU may be configured with one threshold (e.g., a time gap threshold and/or frequency range threshold) per priority. The WTRU may determine which threshold to use, for example, based on the priority of the TB.

A threshold may be associated with the CBR of the resource pool. The WTRU may be configured with a threshold per CBR range. The WTRU may determine which threshold to use, for example, based on the measured CBR of the resource pool.

A threshold may be associated with the HARQ type of the TB. For example, the WTRU may be configured with two sets of thresholds (e.g., a time gap threshold and/or frequency range threshold). One set of thresholds may be associated with the HARQ enabled TB, and another set of thresholds may be associated with the HARQ disabled TB. The WTRU may determine which set of thresholds to use, for example, based on the HARQ type of the TB.

A threshold may be associated with the traffic type of the TB (e.g., unicast, groupcast and/or broadcast, such as periodic traffic and/or aperiodic traffic). For example, the WTRU may be configured with two sets of thresholds (e.g., a time gap threshold and/or frequency range threshold) in which the first set may be used for periodic traffic and the other set may be used for aperiodic traffic. The WTRU may determine which threshold to use, for example, based on the traffic type of the TB.

A WTRU may determine the number of retransmissions of the discovery message. A WTRU may be (pre)configured with a number of retransmissions (e.g., minimum and/or maximum number of retransmissions) for a discovery message. A WTRU may (e.g., randomly) select the number of retransmissions for a discovery message, for example, within a (pre)configured minimum and maximum number of retransmissions.

A WTRU may perform resource selection in a shared resource pool between discovery and other data. A WTRU may perform resource selection for discovery transmission in a shared resource pool between discovery and data. A WTRU may select one or more (e.g., all) transmissions of a discovery message in the time/frequency resource configured for discovery transmission. A WTRU may select (e.g., the first) several resources in the time/frequency resource configured for discovery transmission. A WTRU may (e.g., be restricted to) make a selection at an initial transmission in a time/frequency resource configured for discovery transmission. This approach may support decoding of discovery messages by other WTRUs, for example, if the other WTRUs do not sense the whole data resource pool.

A WTRU may indicate power control and discovery decoding. A WTRU may indicate the WTRU's transmission power in a discovery message. A WTRU may implicitly/explicitly indicate the WTRU's transmission power information in a discovery message. Transmission power information may be used, for example, to derive the transmission power of the WTRU. Transmission power information may be, for example, one or more (e.g., any combination) of the following: pathloss (e.g., downlink pathloss and/or sidelink pathloss); CBR of the resource pool; transmission power; and/or the like.

A WTRU may explicitly/implicitly send an indication of transmission power for discovery data. A WTRU may indicate transmission power, for example, using one or more (e.g., any combination) of the following: the destination ID; the QoS of the TB; a dedicated field in a message; the transmission resources; the location of the WTRU; and/or the like.

A WTRU may indicate transmission power, for example, using the destination ID. For example, a WTRU may be (pre)configured with multiple destinations. A (e.g., each) destination may be associated with a (e.g., one) transmission power value. A WTRU may, for example, (e.g., implicitly) indicate its transmission power via the destination ID.

A WTRU may indicate transmission power, for example, using the QoS of the TB. A WTRU may (e.g., implicitly) indicate transmission power, for example, via the QoS of the TB (e.g., priority and/or minimum communication range). A WTRU may be (pre)configured with the transmission power, for example, as a function of the transmission priority. A transmitting WTRU (Tx WTRU) may determine the transmission power of the discovery TB, for example, based on the priority of the TB. A receiving WTRU (Rx WTRU) may determine the transmission power of a Tx WTRU, for example, based on the priority field indicated in sidelink control information (SCI) of the TB. A WTRU may be (pre)configured with the transmission power, for example, as a function of the communication range (e.g., minimum communication range). The WTRU may determine transmission power based on the WTRU's communication range (e.g., minimum communication range). A Rx WTRU may determine the transmission power of the Tx WTRU, for example, based on the communication range (e.g., minimum communication range) value indicated in the SCI.

A WTRU may indicate transmission power, for example, using a dedicated field in a message. A WTRU may indicate transmission power, for example, using one or more transmission resources (e.g., the time/frequency resource and/or the number of subchannels used for transmission of the discovery data). A WTRU may be (pre)configured with the transmission resource of discovery data, for example, as a function of one or more (e.g., any combination) of the transmission power information. A WTRU may select a transmission resource, for example, based on the CBR of the resource pool. A WTRU may be (pre)configured with the transmission power, for example, as a function of the number of subchannels used for transmission of a discovery message. An Rx WTRU may determine the transmission power of a Tx WTRU, for example, by the number of subchannels used for discovery transmission.

A WTRU may indicate transmission power, for example, using the location of the WTRU. A WTRU may indicate the WTRU's zone ID (e.g., absolute zone or relative zone) to indicate the WTRU's transmission power. The relative zone may be a zone using the position of a (e.g., one) point (e.g., gNB) as a coordinate in the zone calculation.

A WTRU may implicitly/explicitly send the WTRU's transmission power information using one or more (e.g., any combination) of the following: a first SCI; a second SCI; an SL MAC CE; an SL RRC message; a higher layer message; and/or the like. A WTRU may send the WTRU's discovery transmission power (e.g., in an SL RRC message), for example, if the WTRU changes the power of the WTRU's discovery message transmissions (e.g., as a result of one or more triggers, such as described herein).

A WTRU may indicate the presence of a discovery message. A WTRU may indicate the transmission of a discovery message, for example, in the SCI. A WTRU may use one or more bitfields in the in the (e.g., first) SCI, for example, to indicate the presence of the discovery message in the data carried in the associated PSSCH. A WTRU may be (pre)configured with one or multiple codepoints. A (e.g., each) codepoint may be associated with a (e.g., one) type of discovery. A WTRU may indicate a codepoint associated with the WTRU's discovery type. A WTRU may be (pre) configured, for example, with a bitfield (e.g., one bitfield of two bits) to indicate the presence of a discovery message. For example, the codepoint 01 may be used to indicate the discovery for relay service, code 10 may be used to indicate the direct sidelink discovery, and code 00 may be used to indicate non-discovery data. A WTRU may indicate codepoint 01 or 10, for example, to indicate the presence of discovery data based on the discovery type. An Rx WTRU may determine whether to (e.g., further) decode a message, for example, based on its (pre)configured discovery type to monitor. A WTRU that is not configured to decode a discovery message may not further decode a message, for example, if 01 or 10 is decoded in the bitfield for discovery indication. For example, a WTRU that is configured to monitor a discovery service (e.g., relay service associated with code 01), may refrain from decoding a message, for example, if the discovery bitfield is not 01.

A WTRU may use an SCI format (e.g., a second SCI format) to indicate the presence of the discovery data. The WTRU may use the second SCI to indicate the discovery type. An Rx WTRU may determine whether to (e.g., further) decode the second SCI, for example, based on the indication of the second SCI format for discovery. A WTRU (e.g., an RX WTRU) may (e.g., continue to) decode the second SCI format, for example, if the first SCI indicates the presence of the second SCI format for discovery. The WTRU may refrain from continuing to decode the message, for example, if the first SCI does not indicate the presence of the second SCI format for discovery.

A WTRU may use a different scrambling sequence (e.g., different initialization), e.g., compared with the regular scrambling sequence for the first SCI, for example, to indicate the presence of a discovery message. A WTRU monitoring discovery messages (e.g., monitoring discovery messages only) may use the scrambling sequence dedicated to the discovery message to decode the discovery message.

A WTRU may include other information associated with a discovery message, for example, in the transmission indicating the discovery message and/or in another message (e.g., an SL RRC message, which may provide the information for (e.g., all) discovery transmissions following the message). A WTRU may include (e.g., with the discovery message) one or more elements associated with the characteristics of the discovery message (e.g., as defined herein).

A WTRU may use a MAC header for transmission of a discovery message. The WTRU may be (pre-)configured with a dedicated ID (e.g., a destination L1 ID) for discovery transmission. For instance, the dedicated destination ID for discovery may be a specified or (pre-)configured value (e.g., a field with all 0's). Responsive to receiving (e.g., from a network or an upper layer) discovery data and/or an associated ID (e.g., an L2 ID), the WTRU may perform one or a combination of the following to transmit a discovery message. The WTRU may indicate the dedicated ID (e.g., destination L1 ID) in the SCI. The WTRU may transmit the L2 destination ID (e.g., entire L2 destination ID) in the MAC layer, for example, by constructing a MAC header or MAC PDU that includes at least the associated ID (e.g., entire L2 ID) of the discovery message provided by the network or an upper layer. The WTRU may transmit the L2 destination ID (e.g., entire L2 destination ID) in the MAC layer, for example, by including (e.g., in a PDU transmission that includes the discovery message) a MAC CE that includes the L2 ID (e.g., the full L2 ID). The WTRU may transmit the L2 destination ID (e.g., entire L2 destination ID) in the MAC layer, for example, by transmitting the discovery message using a SL MAC CE (e.g., a discovery MAC CE), where such MAC CE may include the full L2 ID and/or the discovery data. The WTRU may transmit the discovery message based on carrying out one or more of the operations described herein.

A WTRU may indicate an L2 ID to an upper layer, for example, by reading the MAC header of a discovery message. The WTRU may be (pre-)configured with a (e.g., one) dedicated ID (e.g., destination L1 ID) for discovery reception. The WTRU may (e.g., based on detection of a discovery message) read an ID (e.g., destination L2 ID), which may be indicated in the MAC header of the message, in a MAC CE, or within a MAC PDU. The WTRU may indicate the obtained ID and/or the associated measurement to an upper layer.

A WTRU may prioritize between discovery and data transmission. A WTRU may prioritize transmissions among different resource pools. A WTRU may be (pre)configured with a priority threshold for a (e.g., each) resource pool. A WTRU may (e.g., for each resource pool) be (pre)configured with a set of associated resource pools, for example, to determine which time/frequency resources of the transmission resource pool overlaps with the associated resource pool.

A WTRU may prioritize transmission among different resource pools during a resource selection procedure. A WTRU may determine whether to exclude time/frequency resources overlapping with other resource pools, for example, based on the priority of the transmission and/or the (pre)configured priority of the resource pool. A WTRU may exclude (e.g., all) the overlapping time/frequency resources of other resource pools during a resource selection procedure, for example, if the priority of the TB is larger/smaller than the (pre)configured priority of the resource pool. The WTRU may refrain from excluding the overlapping resources during the resource selection procedure, for example, if the priority of the TB is smaller/larger than a threshold.

A WTRU may be (pre)configured with multiple (e.g., two) resource pools. One resource pool may be used for data transmission and the other resource pool may be used for discovery transmission. The WTRU may be configured with one priority threshold for the data resource pool and another priority threshold for the discovery resource pool. The WTRU may perform resource selection for a (e.g., one) TB in the data resource pool. The WTRU may exclude (e.g., all) the overlapping time/frequency resources with the discovery resource pool, for example, if the priority of the TB is larger/smaller than the (pre)configured priority. A WTRU may perform resource selection for a discovery message in the discovery resource pool. The WTRU may exclude all the overlapping time/frequency resources with the data resource pool, for example, if the priority of the discovery message is larger/smaller than the (pre)configured priority of the discovery resource pool.

A WTRU may use a dedicated resource pool for transmission of a discover message.

A WTRU may calculate a CR in a shared resource pool between discovery data and other data. A WTRU may, for example, apply one or more of the following in a CR calculation: exclude the discovery transmission from a CR calculation; exclude the discovery transmission, with discovery data only, from CR calculation; and/or the like. This approach may support prioritizing discovery transmission in a resource pool.

A WTRU may use the remaining PRBs in a resource pool for a discovery transmission. A WTRU may be (pre)configured with $N_{PRB}$ for a resource pool having the subchannel size of $N_{size}$. The WTRU may use the remaining PRBs $$\left( e.g., N_{PRB} - N_{size} * \left\lfloor \frac{N_{PRB}}{N_{size}} \right\rfloor \ PRBs \right)$$

of the resource pool for transmission of a discovery message. This approach may support reuse of the remaining frequency resources of a resource pool.

A WTRU may perform resource selection in a discovery resource pool. A WTRU may use one or more (e.g., any combination) of the following procedures to perform resource selection in a discovery resource pool: sensing-based resource allocation; random resource selection; and/or the like.

A WTRU may perform random resource selection. A WTRU may perform random resource selection, for example, based on a WTRU ID. A WTRU may determine the subchannel index and/or slot index of the discovery transmission, for example, as a function of WTRU ID.

A WTRU may perform sensing-based resource selection. A WTRU may perform sensing-based resource selection in a discovery resource pool. A WTRU may use a (e.g., one) RSRP threshold to determine the availability threshold of a discovery transmission.

Features are described herein that may be associated with discovery message transmission and/or reception (e.g., power efficient discovery transmission/reception). A WTRU may determine whether to transmit a discovery message. The WTRU may determine whether to transmit a message (e.g. discovery message) based on one or more of the following: whether the WTRU (e.g. remote WTRU, source WTRU, or destination WTRU) is connected to a relay or not; a load of the WTRU; a CR of the WTRU; a CBR of the resource pool (e.g. CBR of a discovery resource pool and/or CBR of a data resource pool); a priority of the discovery service and/or priority of the TB having discovery data; a channel quality and/or status of the existing sidelink (e.g., sidelink the WTRU is connected to); a synchronization status of the WTRU; or a reception of a message from another node. The WTRU may transmit a message (e.g. discovery message) based on the determination.

A WTRU may determine whether to transmit a message (e.g. discovery message) based on whether the WTRU is connected to a relay or not. The WTRU (e.g., remote WTRU or relay WTRU) may refrain from transmitting (e.g., not transmit) a discovery message, for example, if it is already connected to a relay. For example, the WTRU may not be allowed to transmit a discovery message if it is already connected to a relay. In examples, this may be associated with restricting the unnecessary discovery transmission.

A WTRU may determine whether to transmit a message (e.g. discovery message) based on the load of the WTRU. The WTRU (e.g., relay WTRU) may refrain from transmitting (e.g., not be allowed) to transmit a discovery message based on the load of the WTRU. The WTRU may be allowed to transmit a discovery message, for example, if the load of the WTRU is smaller than a threshold. If the load is greater than a threshold, the WTRU may refrain from transmitting (e.g., not be allowed to transmit) a discovery message. The load threshold of the WTRU may be (pre-)configured, for example, with one or more other parameters (e.g., CBR of the resource pool, QoS of the service, etc.). The load of the WTRU may be determined based on one or any combination of the following: a number of connected WTRUs, links, and/or the number of established radio bearers, etc.; a buffer status of the WTRU; or a CR of the WTRU, the amount of data being transmitted/received, and/or the amount of data expected to be transmitted/received.

The load of the WTRU may be determined based on at least the buffer status of the WTRU. The WTRU may refrain from transmitting (e.g., not be allowed to transmit) a discovery message if the total amount of data in the buffer is greater than a threshold, and, may be allowed to transmit (e.g., may transmit) the discovery message if the total amount of data in the buffer is less than the threshold. The WTRU may refrain from transmitting (e.g., not be allowed to transmit) a discovery message if the amount of data in a set of LCGs/LCHs is greater than a threshold, and, may be allowed to transmit (e.g., may transmit) the discovery message if the amount of data in the set of LCGs/LCHs is less than the threshold. The set of LCGs/LCHs may be determined as the set of LCGs/LCHs having higher priorities than the priority of the discovery data.

A WTRU may determine whether to transmit a message (e.g., discovery message) based on the CR of the WTRU. The WTRU may refrain from transmitting (e.g., not be allowed to transmit) a discovery message if the CR of the WTRU is greater than a threshold, and, may be allowed to transmit (e.g., may transmit) the discovery message if the CR of the WTRU is greater than a threshold. The CR may be determined based on the transmission activity of the WTRU, e.g., in the data resource pool(s) and/or discovery resource pool(s). In examples, this may be associated with managing the discovery transmission of WTRUs in the discovery resource pool. The WTRU may be configured with a CR threshold, e.g., in a data communication resource pool to determine whether it can transmit discovery messages in the discovery resource pool. The WTRU may be allowed to transmit a discovery message if the CR in the data communication resource pool is smaller than a threshold. If the CR is greater than the threshold, the WTRU may refrain from transmitting (e.g., not be allowed to transmit) discovery messages in the discovery resource pool.

A WTRU may determine whether to transmit a message (e.g. discovery message) based on the CR of the WTRU. The WTRU may stop transmitting discovery messages for a period and/or increase/decrease the periodicity of the discovery message, for example, if the WTRU could not detect one or multiple WTRUs to connect to during a transmission period of the discovery messages. For example, a remote WTRU may transmit a discovery message (e.g., solicitation message), for example, using model B. The WTRU may (e.g., at first) transmit discovery messages periodically using the first transmission period. The WTRU may (e.g., after a certain duration threshold) increase the transmission periodicity of the discovery message. The duration threshold and/or the transmission periodicities of the discovery message (e.g., the first and/or the second maximum/minimum transmission periodicity) may be configured, for example, per resource pool and/or per service. In examples, this may be associated with reducing power consumption due to discovery monitoring.

A WTRU may determine whether to transmit a message (e.g., discovery message) based on a CBR of the resource pool. The WTRU may refrain from transmitting (e.g., not be allowed to transmit) a discovery message in a discovery resource pool or a data communication resource pool, for example, if the CBR of a resource pool (e.g., the data communication resource pool or a discovery message resource pool) is larger than a threshold (e.g., and vice versa). The threshold may be configured per resource pool. In examples, this may be associated with controlling the congestion of a data or discovery resource pool. The WTRU may be configured with two resource pools. One resource pool may be used for data transmission and the other resource pool may be used for discovery transmission. The WTRU may be configured with a CBR threshold in the data resource pool such that if the CBR of the resource pool is greater than a threshold, the WTRU may refrain from transmitting (e.g., not be allowed to transmit) a discovery message in the discovery resource pool (e.g., and vice versa).

A WTRU may determine whether to transmit a message (e.g. discovery message) based on a priority of the discovery TB. The WTRU may determine whether to transmit a discovery TB in a resource pool based on the priority of the TB. The discovery of the TB may be transmitted in the resource pool based on its priority, e.g., may be transmitted if its priority is greater/smaller than a threshold. Otherwise, the WTRU may refrain from transmitting (e.g., not be allowed to transmit) in the resource pool. The priority threshold may be configured, e.g., per CBR range and/or per resource pool.

The channel quality and/or status of the sidelink (e.g., existing sidelink) may be used in relation to the TB. The WTRU may determine whether to transmit a discovery TB in a resource pool based on the channel quality and/or status of the current sidelink (e.g., sidelink to which the WTRU is connected. The WTRU may determine to transmit the discovery message if the channel quality of the current sidelink is below a threshold. Otherwise, the WTRU may refrain from transmitting (e.g., not be allowed to transmit) a discovery message. A remote WTRU may be allowed to transmit a discovery message to look for another relay, for example, if the RSRP measured in the sidelink with the current relay (e.g., relay to which the WTRU is connected) is smaller than a threshold (e.g., and vice versa). The threshold may be (pre-) configured per resource pool and/or per relay service.

A WTRU may determine whether to transmit a message (e.g. discovery message) based on the synchronization status of the WTRU. The WTRU may determine whether to transmit a discovery TB based on the synchronization status of the WTRU. The synchronization status of the WTRU may be determined based on one or any of the following: an availability of a synchronization source; a priority of the synchronization source; or whether the WTRU has transmitted a synchronization signal or not.

The remote WTRU may determine to transmit a (e.g., one) discovery message to find a WTRU-to-network relay. The remote WTRU may refrain from transmitting (e.g., not be allowed to transmit a discovery message) if it is not synchronized to the gNB and/or a WTRU directly synchronized to a gNB.

A WTRU may determine to transmit a discovery message to find a WTRU-to-WTRU relay. The WTRU may refrain from transmitting (e.g., not be allowed to transmit) the message if it is not synchronized with any synchronization source (e.g., or vice versa). The WTRU may refrain from transmitting (e.g., not be allowed to transmit) a discovery message if the priority of the synchronization source is smaller than a threshold (e.g., or vice versa).

A WTRU (e.g. relay WTRU) may determine to transmit a discovery message if it has a synchronization source or it has transmitted a synchronization message. In examples, this may be associated with enabling that the remote WTRU can synchronize to the relay WTRU to properly connect to the relay WTRU.

A WTRU may determine whether to transmit a message (e.g. discovery message) based on the reception of a message from another node. The WTRU may determine whether to transmit a discovery message based on the reception of another message from another node (e.g. the discovery message from another WTRU). For example, for a WTRU-to-WTRU scenario, the relay WTRU may determine to transmit a discovery message if it receives a discovery message (e.g. solicitation message) from a remote WTRU. In examples, this may be associated with reducing the discovery transmission overhead of a relay WTRU.

A WTRU may trigger monitoring and/or stop monitoring of a discovery resource pool. The WTRU may trigger monitoring and/or stop monitoring a resource pool (e.g. a discovery resource pool) based on one or more of the following: whether the WTRU (e.g. remote WTRU, source WTRU, or destination WTRU) is connected to a relay or not; a load of the WTRU; a CR of the WTRU; a CBR of the resource pool (e.g. CBR of a discovery resource pool and/or CBR of a data resource pool); a priority of the discovery service and/or priority of the TB having discovery data; a channel quality/status of the sidelink and/or the Uu link; or a synchronization status of the WTRU. The discovery resource pool monitoring may include one or more of the following: decoding of SCI, e.g., to look for a discovery message for itself and determine the reserved resources; or measuring RSRP, RSSI, CBR, etc.

A WTRU may trigger monitoring and/or stop monitoring of a discovery resource pool based on whether the WTRU is connected to a relay or not. A WTRU (e.g. remote WTRU) may trigger or stop monitoring a discovery resource pool based on its sidelink connection status (e.g., current sidelink connection status). The WTRU may stop monitoring a discovery resource pool, for example, if it already has a connection with one relay. The WTRU may trigger monitoring a discovery resource pool, for example, if it does not have a connected relay.

A WTRU may trigger monitoring and/or stop monitoring of a discovery resource pool based on the load of the WTRU. The WTRU (e.g. relay WTRU) may trigger or stop monitoring a discovery resource pool based on the load of the WTRU. The WTRU may trigger monitoring a discovery resource pool, for example, if the load of the WTRU is smaller than a threshold. The WTRU may stop monitoring a resource pool, for example, if its load is greater than another threshold. The load threshold of the WTRU may be (pre-)configured, e.g., with other parameters (e.g., CBR of the resource pool, QoS of the service, etc.).

A WTRU may trigger monitoring and/or stop monitoring of a discovery resource pool based on a CBR of the resource pool. The WTRU may trigger monitoring of a discovery message based on the CBR of a resource pool. The CBR used to trigger monitoring a discovery resource pool may be measured in the discovery resource pool (e.g., current discovery resource pool) and/or an associated data resource pool. The WTRU may trigger monitoring a discovery resource pool, for example, if a CBR of an associated data communication resource pool is smaller/greater than a threshold. The threshold may be (pre-)configured, e.g., per resource pool and/or the priority of the relay service.

The WTRU may determine to stop monitoring a discovery resource pool based on the CBR of a resource pool. The CBR used to stop monitoring a discovery resource pool may be measured in the discovery resource pool and/or an associated data resource pool. The WTRU may stop monitoring a discovery resource pool, for example, if a CBR of an associated data communication resource pool is greater than a threshold. The threshold may be (pre-)configured, e.g., per resource pool and/or the priority of the relay service.

A WTRU may trigger monitoring and/or stop monitoring of a discovery resource pool based on the channel quality/status of the existing sidelink (e.g., sidelink the WTRU is connected to). The WTRU may trigger monitoring of a discovery message based on the channel quality/status of the existing sidelink and/or the Uu link. The WTRU may trigger monitoring the discovery resource pool, for example, if the channel quality/status of the existing sidelink satisfies a predefined triggering condition of the existing sidelink and/or the Uu link. The triggering condition may be one or more of the following: an RSRP of the existing sidelink and/or the RSRP of the Uu is smaller than a threshold; a WTRU receives an indication from the peer WTRU to stop an ongoing connection; or a WTRU decides to stop the sidelink connection (e.g., current sidelink connection). In examples, this may be associated with reducing the power consumption due to monitoring the discovery resource pool.

A WTRU may trigger monitoring and/or stop monitoring of a discovery resource pool based on the synchronization status of the WTRU. The WTRU may trigger monitoring a discovery resource pool, for example, if it synchronized to a synchronization source. The WTRU may stop monitoring a discovery resource pool, for example, if it loses synchronization. The WTRU may stop monitoring a discovery resource pool due to one or more of the following: the WTRU is not synchronized to global navigation satellite systems (GNSS); the WTRU is not synchronized to a base station (e.g., a gNB); the WTRU does not detect a sidelink synchronization signal (SLSS) for a period; or the WTRU does not transmit SLSS.

The WTRU may determine the monitoring resource pool based on its power saving state. The WTRU may be (pre-)configured with one or multiple resource pools. Each resource pool may be associated with one or multiple power saving states. The WTRU may determine which resource pool to monitor based on its power saving state. The WTRU may switch the monitoring resource pool if it switches the power saving state.

The WTRU may switch its power saving state based on reception activity of the WTRU. The WTRU may switch from a first power saving state (e.g. high-power consumption state) to a second power saving state (e.g., lower power consumption state), for example, if it does not find a relay and/or a remote WTRU, e.g., for a period.

The WTRU may use a resource pool monitoring time (e.g., via a timer), for example, to determine the power saving state of resource pool monitoring. The WTRU may track a duration of time (e.g., initiate a timer) if it monitors a resource pool. If the duration of time expires (e.g., the timer expires), the WTRU may change the monitoring resource pool. The WTRU may stop tracking the duration of time (e.g., stop the timer) if the WTRU found a relay and/or a remote WTRU. In examples, this may be associated with helping the WTRU reduce power consumption due to resource pool monitoring.

Features associated with platoon-based discovery may be disclosed herein. In examples, users (e.g., user A and B) may belong to a platoon and may want to communicate to each other, for example, via a relay of the platoon.

A WTRU may include an ID associated with the group in a discovery message. A WTRU (e.g. source WTRU, destination WTRU) may include one or more of the following IDs in the discovery message, e.g., to facilitate the discovery: ID(s) associated with the platoon in the discovery message; ID(s) of the target WTRU(s) (e.g. target member ID within a platoon); ID(s) of the source WTRU(s) (e.g. source member ID within a platoon); or a set of possible relay WTRU IDs.

A WTRU may include the source and/or destination ID in the discovery message. The WTRU ID(s) may be obtained from one or multiple messages (e.g. discovery message), for example, sent from source and/or destination WTRUs. The WTRU may include the WTRU ID(s) in the discovery message, e.g., if it determines to serve as a relay for the WTRU.

A WTRU may include sidelink measurement(s) associated with the WTRU ID. The WTRU (e.g. relay WTRU) may include one or multiple sidelink measurements (e.g. SL RSRP), where each of the one or more multiple sidelink measurements may be associated with one source/destination WTRU included in the discovery message. The WTRU may include the source/destination ID based on one or more of the following: the SL RSRP of the corresponding sidelink (e.g., the WTRU may include the WTRU ID in the discovery message if the SL RSRP of the corresponding sidelink is greater than a threshold; the threshold may be (pre-)configured, e.g., per relay service and/or per resource pool); or the QoS of the requested relay service(s).

A relay WTRU may determine whether to forward a discovery message. A relay WTRU may determine whether to forward a discovery message based on the sidelink quality between itself and the target WTRU. The sidelink quality may be determined based on the RSRP of the data communication between itself and the target WTRU. The relay WTRU may determine whether to forward a discovery message based on a set of IDs included in the discovery message. The WTRU may forward the discovery message, for example, if the WTRU ID belongs to the set of IDs included in the discovery message. Otherwise, it may refrain from forwarding the discovery message.

A WTRU may select a discovery type and/or a resource pool. The WTRU may be (pre-) configured with one or multiple discovery types. One or more of these discovery types (e.g., each discovery type) may be associated with one or a combination of the following parameters/configurations: a discovery packet size, multiplexing behaviors, a resource transmission type (e.g., aperiodic, semi-persistent, or periodic transmission), a bandwidth (e.g., a number of subchannels used for the discovery transmission), an MCS, a transmission power (e.g., whether power boosting is used or not and/or which power level is used), a priority level, a discovery model (e.g., discovery model A, discovery model B, etc.), or an LCH to use for a discovery messages.

With respect to the discovery packet size, the WTRU may be (pre-)configured with multiple discovery message sizes, wherein one or more of the message sizes (e.g., each message size) may be associated with respective discovery types. With respect to the multiplexing behaviors, a first discovery type may allow multiplexing with other data while a second discovery type may not allow multiplexing with other data. With respect to the transmission power, a first discovery type (e.g., discovery message type) may use low transmission power while a second discovery type may use high transmission power. With respect to the priority level, a (e.g., each) discovery message type may assign different priority levels for Tx and Rx. In examples (e.g., for LCP, UL/SL prioritization, transmission in SCI, or other functions), a priority may be assigned to a transmission.

A WTRU may select a discovery type (e.g., a discovery message type). The WTRU may select the discovery message type based on one or more of the following: a resource pool used or determined for discovery transmission, QoS requirements of a relay service (e.g., associated with a discovery message or data being transmitted via the relay), coverage information and/or a Uu measurement of the cell of which the WTRU is in coverage, a scheduling mode (e.g., mode 1 or mode 2), a WTRU type (e.g., including specific characteristics of the WTRU or WTRU capabilities), a need (e.g., an urgency or importance) to find a relay (e.g., a new relay), whether the WTRU is already connected to a relay (e.g., whether discovery is for selection or reselection), whether a discovery message may include additional AS information (e.g., such as system information), or whether a discovery message may be based on the type of AS layer information that may be included with the discovery message.

With respect to selecting a discovery message type based on a resource pool, the WTRU may be (pre-)configured one or multiple resource pools. A (e.g., each) configured resource pool may be associated with one or more discovery types. The WTRU may determine which discovery type to transmit based on the resource pool used or determined for discovery transmission/reception. For example, the WTRU may be (pre-)configured with two resource pools and two message types. The first resource pool may be associated with the first discovery type, which may allow multiplexing with data. The second resource pool may be associated with the second discovery type, which may not allow multiplexing with data.

With respect to selecting a discovery message type based on the QoS requirements of a relay service, the WTRU may use a first discovery type (e.g., with high transmission power and/or high transmission/reception priority) for high QoS requirements services. The WTRU may use a second discovery type (e.g., with low transmission power and/or low transmission/reception priority) for low QoS requirement services. The WTRU may be configured with a specific discovery type to be used for a given L2 destination ID associated with the discovery message (e.g., a given L2 destination ID may be associated with type 1 and/or type 2). The QoS requirements may be determined based on a bearer configuration and/or the priority of a bearer or channel being relayed. For example, the WTRU may select a specific discovery type if an LCH of the WTRU that is being relayed has a priority above a threshold (e.g., a configured threshold), or the configuration for the LCH specifies the use of that discovery type.

With respect to selecting a discovery message type based on coverage information or a Uu measurement of the cell of which the WTRU is in coverage, the WTRU may use a first discovery type if it is in network coverage and may use a second discovery type if it is out of network coverage.

With respect to selecting a discovery message type based on a scheduling mode (e.g., mode 1 or mode 2), the WTRU (e.g., which may be a relay WTRU) may use a first discovery type if the discovery resource transmission is scheduled by the network and may use a second discovery type if the discovery resource transmission is selected by the WTRU.

With respect to selecting a discovery message type based on WTRU types (e.g., including specific characteristics of the WTRU or capabilities of the WTRU), the WTRU types may include a relay WTRU, a remote WTRU, a WTRU-to-network (U2N) relay/remote WTRU, a WTRU-to-WTRU (U2U) relay/remote WTRU, a pedestrian WTRU or VUE, a power saving WTRU, or a non-power saving WTRU. The capabilities of the WTRU may include whether the WTRU can transmit discovery type 1 or discovery type 2. In examples, a WTRU configured as a relay WTRU may transmit discovery of a first type, while a WTRU configured as a remote WTRU may transmit discovery of a second type. In examples, a WTRU configured to be a type 2 capable WTRU may transmit discovery of type 2.

With respect to selecting a discovery message type based on the need (e.g., urgency or importance) for finding a relay, a remote WTRU may use a discovery type if it triggers discovery transmission as a result of not being able to communicate with its connected relay (e.g., if SL RSRP is less than a pre-configured threshold, if an SL RLF is triggered, etc.).

A WTRU may select one or more resource pools for discovery transmission. The WTRU may be (pre-)configured with one or multiple resource pools for discovery transmissions. The WTRU may be (pre-)configured with one or multiple shared resource pools for data transmission and/or one or more dedicated resource pools for discovery transmission (e.g., for discovery transmission only). The WTRU may determine which resource pool(s) to use for transmission of discovery messages based on one or any combination of the following.

The WTRU may determine which resource pool(s) to use for discovery transmission based on a CBR associated with the resource pool(s). For example, the WTRU may be (pre-)configured to (e.g., always) use a resource pool for discovery transmission if the CBR associated with the resource pool is smaller than a threshold (e.g., which may be configured). The WTRU may perform one or more of the following if the CBR associated with the resource pool is larger than a threshold. The WTRU may switch to another resource pool. The WTRU may report the CBR associated with the resource pool to the network and/or implicitly/explicitly request another resource pool configuration for discovery transmission. The WTRU may trigger an SR and/or an SL-BSR to report the availability of discovery transmission.

The WTRU may use a dedicated resource pool for discovery transmission, for example, if the CBR associated with the resource pool is smaller than a threshold. The WTRU may switch to a dedicated resource pool if the CBR associated with the dedicated resource pool is larger than a threshold. The WTRU may use a dedicated resource pool for discovery transmission if the CBR associated with the resource pool is smaller than a threshold. The WTRU may trigger an SR and/or a BSR to report the availability of discovery transmission, for example, if the CBR associated with the dedicated resource pool is larger than a threshold. One or more of the thresholds described herein may be configured (e.g., by a network or an upper layer, such as via RRC signaling).

The WTRU may determine which resource pool(s) to use for discovery transmission based on the type of discovery transmission (e.g., a discovery type described herein) and/or the frequency of discovery traffic. For example, the WTRU may select a first resource pool for semi-persistent discovery transmission and a second resource pool for dynamic and/or semi-persistent discovery transmission. The UE may select a dedicated resource pool for semi-persistent transmission and a shared resource pool for dynamic discovery transmission, or vice versa.

The WTRU may be allowed to reserve one or multiple periodic resources in a resource pool (e.g., a dedicated resource pool), for example, if the periodicity of the resources is larger than a threshold (e.g., a pre-configured threshold). The WTRU may (e.g., based on arrival of discovery data) determine whether to perform resource selection in a dedicated resource pool or wait for a reserved resource in a dedicated resource pool.

The WTRU may determine which resource pool(s) to use for discovery transmission based on the availability of a relay for a remote WTRU. For example, the WTRU may select a dedicated resource pool for relay selection and a shared resource pool for relay reselection. The WTRU may transmit a discovery message in a dedicated resource pool, for example, if the WTRU does not have a relay. The WTRU may transmit a discovery message in a shared resource pool, for example, if the WTRU is connected to a relay.

The WTRU may determine which resource pool(s) to use for discovery transmission based on the QoS of a relay service and/or the QoS of a discovery message. For example, a WTRU transmitting and/or relaying data over an LCH with a specific priority may chose a dedicated resource pool over a shared resource pool.

The WTRU may determine which resource pool(s) to use for discovery transmission based on the CR of the WTRU. For example, the WTRU may be (pre-)configured with one or multiple CR thresholds to determine whether the WTRU is to transmit a discovery message in a dedicated and/or shared resource pool. The CR thresholds may be a function of the priority of the discovery message. The CR thresholds may be (pre-)configured for one or more resource pools (e.g. per resource pool). For example, if the CR measured in a dedicated resource pool of the WTRU is greater than a CR threshold, the WTRU may transmit a discovery message in a different resource pool (e.g., a shared resource pool). If the CR measured in a dedicated resource pool of the WTRU is less than or equal to a CR threshold, the WTRU may transmit a discovery message in a dedicated resource pool. If the CR measured in a shared resource pool is smaller than a CR threshold, the WTRU may transmit a discovery message in the shared resource pool. If the CR measured in a shared resource pool is equal to or greater than a CR threshold, the WTRU may transmit the discovery message in a dedicated resource pool.

The WTRU may determine which resource pool(s) to use for discovery transmission based on the load (e.g., data load) of the WTRU. For example, the WTRU may transmit a discovery message in a dedicated resource pool(s), or it may request resources for discovery transmission if the load of WTRU is greater than a threshold. The load of the WTRU may be associated with the amount of pending data to be relayed. The load of the WTRU may be determined as the amount of data (e.g., to be relayed) having a priority higher than a priority threshold. The priority threshold may be a function of the priority of the discovery message.

The WTRU may determine which resource pool(s) to use for discovery transmission based on the subchannel size of the resource pool. The WTRU may be (pre-)configured with a resource pool (e.g., multiple resource pools) to transmit discovery message. The WTRU may determine which resource pool to transmit a discovery message, for example, based on the subchannel size of the resource pool. The WTRU may select the resource pool (e.g., with the lowest subchannel size) from the set of resource pools (pre-)configured for discovery transmission. The WTRU may select the resource pool, for example, if the subchannel size is smaller than a threshold.

The WTRU may determine which resource pool(s) to use for discovery transmission based on whether a physical sidelink feedback channel (PSFCH) is (pre-)configured in the resource pool. The WTRU may prioritize the resource pool (e.g., without PSFCH transmission being configured). If PSFCH transmission is configured in all resource pools, the WTRU may prioritize the resource pool with highest PSFCH transmission period.

The WTRU may determine which resource pool(s) to use for discovery transmission based on a carrier (pre-)configured for sidelink data transmission and carrier(s) (pre-)configured for discovery transmission). The WTRU may prioritize the resource pool in the same carrier with the resource pool (pre-) configured for sidelink data transmission.

The WTRU may determine which resource pool(s) to use for discovery transmission based on the received configuration information. The WTRU may prioritize the resource pool for discovery transmission, for example, if it receives the configuration information (e.g., via RRC signaling). If the WTRU receives the configuration information from the SIB or if the resource pool is (pre-)configured, the WTRU may refrain from prioritizing (e.g., not prioritize) such resource pool. The WTRU may determine which resource pool to transmit discovery, for example, using other criteria (e.g., based on the CBR of the resource pool).

The WTRU may determine which resource pool(s) to use for discovery transmission based on whether semi-persistent reservation is disabled/enabled in the resource pool. In examples, the WTRU may prioritize the resource pool with semi-persistent reservation enabled.

The WTRU may perform discovery transmission in multiple (e.g., both) resource pools (e.g., both shared and dedicated resource pool). The WTRU may be (pre-)configured to prioritize one resource pool (e.g., dedicated resource pool), for example, if the CBR of the resource pool is smaller than a threshold. The WTRU may transmit discovery in another resource pool, for example, if the CBR of the prioritized resource pool is larger than the (pre-)configured threshold. This approach may increase the probability that discovery message can reach the intended receivers for congested scenarios.

Discovery enhancement, relay reselection, and/or cell reselection may be performed. The WTRU may determine whether to transmit sidelink data, for example, based on discovery transmission/reception. In examples, the WTRU may be configured (e.g., preconfigured) to prioritize discovery transmission/reception. In examples, the WTRU may be configured (e.g., preconfigured) to stop transmitting data (e.g., Uu and/or SL) of a priority and/or service, if discovery transmission/reception is prioritized. For example, the WTRU may be configured (e.g., preconfigured) with a priority threshold. If the WTRU needs to transmit/receive discovery data, the WTRU may refrain from performing a transmission of data having priority lower than the priority threshold. In examples, the WTRU may reduce the number of (re)transmissions for a sidelink TB, for example, if the WTRU determines to prioritize discovery transmission/reception. In examples, the WTRU may prioritize sidelink discovery transmission over Uu transmission. The WTRU may be configured with an LCH to determine whether to prioritize UL transmission over SL discovery transmissions. For example, the WTRU may apply such thresholds if the WTRU determines that the WTRU needs to perform discovery transmission/reception. The WTRU may determine whether to perform discovery transmission/reception based on one or any combination of the following events: the WTRU receives an RLF indication from the relay WTRU, the WTRU triggers an RLF (e.g., an SL RLF and/or Uu RLF), and/or the WTRU receives an indication from the network (e.g. in dedicated RRC signaling).

The WTRU may perform congestion control for discovery data. In examples, the WTRU may be configured (e.g., preconfigured) with two or more sets of congestion control parameters, which, for example, may include one or any combination of the following parameters: a transmission power (e.g., maximum transmission power), an MCS (e.g., a maximum and minimum MCS), a number (e.g., a maximum number) of retransmissions for a TB, and/or a number (e.g., a maximum number) of subchannels used for one transmission.

The WTRU may be configured (e.g., preconfigured) with one set of parameters for data transmission (e.g., normal data transmission) and another set of parameters may be used for discovery transmission. The WTRU may be configured (e.g., preconfigured) with a set of parameters for each range of the CBR and/or CR of the resource pool. The WTRU may determine which set of parameters to use based on whether a transmission is associated with data transmission or discovery transmission. If a transmission contains data from logical channels associated with data only (e.g., no LCHs associated with discovery), for example, the Tx WTRU may use the first set of congestion control parameters associated with data. If a transmission contains data from logical channels associated with discovery only (e.g., no LCHs associated with data), for example, the Tx WTRU may use the second set of congestion control parameters associated with discovery. The Tx WTRU may use the first set of parameters or may use the second set of parameters, for example, if the transmission contains both discovery and data.

A WTRU may determine which resource pool to transmit discovery data. A WTRU may be configured with multiple resource pools, for example, where the WTRU may transmit discovery data. For example, the WTRU may be configured with a resource pool dedicated to discovery data transmissions, and the WTRU may be configured with another resource pool that may allow both data transmission and discovery transmission. The WTRU may be provided with rules (e.g., specific rules), for example, regarding whether either pool should be utilized. The WTRU may decide which of the pool(s) or pool types can be used to transmit discovery, for example, based on any combination of the following: the CBR of the resource pool, the CR of the WTRU in a resource pool, the QoS of the TB, the load of the WTRU, and/or the expected transmission power of the discovery message.

The WTRU may decide which of the pool(s) or pool types can be used to transmit discovery, for example, based on the CBR of the resource pool. For example, the WTRU may be configured (e.g., preconfigured) with a CBR threshold allowing discovery transmission in the pool. The WTRU may transmit discovery in the resource pool, for example, if the CBR is smaller than the threshold. Otherwise, the WTRU may refrain from transmitting discovery in the resource pool. The WTRU, in this case, may transmit discovery in a dedicated discovery resource pool or a pool not configured with such CBR threshold(s).

The WTRU may decide which of the pool(s) or pool types can be used to transmit discovery, for example, based on the CR of the WTRU in a resource pool. For example, the WTRU may be configured (e.g., preconfigured) with a CR threshold, where the CR threshold may be associated with the CR of the WTRU in that resource pool. The WTRU may transmit discovery in the resource pool, for example, if the CR is smaller than the threshold. Otherwise, the WTRU may refrain from transmitting discovery in the resource pool. The WTRU, in this case, may transmit discovery in a dedicated resource pool or a pool not configured with such CR threshold(s).

The WTRU may decide which of the pool(s) or pool types can be used to transmit discovery, for example, based on the QoS of the TB. For example, the WTRU may be configured (e.g., preconfigured) with a priority threshold. The WTRU may be allowed to transmit discovery in the resource pool, for example, if the priority of the TB or the discovery message is larger than a threshold. Otherwise, the WTRU may refrain from transmitting discovery in the resource pool and may (e.g., need to) transmit discovery in the dedicated pool.

The WTRU may decide which of the pool(s) or pool types can be used to transmit discovery, for example, based on the load of the WTRU. For example, the WTRU may be configured (e.g., preconfigured) with a load threshold in a resource pool. The WTRU may determine whether to transmit discovery in the resource pool, for example, based on the load of the WTRU. The WTRU may transmit discovery in the resource pool, for example, if load is smaller than a threshold. Otherwise, the WTRU may refrain from transmitting discovery in the resource pool. The WTRU may measure its load, for example, based on the amount of data in its buffers, the average/expected data rate being transmitted/received/relayed, the number of unicast links and/or remote WTRUs being served, or similar criteria associated with measuring load at a WTRU.

The WTRU may decide which of the pool(s) or pool types can be used to transmit discovery, for example, based on the expected transmission power of the discovery message. The WTRU may be configured (e.g., preconfigured) with a transmission power threshold of discovery, such as a maximum transmission power threshold and/or a minimum transmission power threshold of discovery. The WTRU may further determine the maximum/minimum power, for example, based on an open-loop or closed loop power control formula. The WTRU may determine an expected/required transmission power associated with the discovery transmission. The WTRU may transmit discovery in the resource pool, for example if the transmission power of discovery is smaller than the maximum power threshold and/or larger than the minimum transmission power threshold. Otherwise, the WTRU may refrain from transmitting discovery in the resource pool.

The WTRU may switch discovery transmission to another resource pool. In examples, the WTRU may be configured (e.g., preconfigured) with two or more resource pools to transmit discovery (e.g., a normal resource pool and an exceptional resource pool). The WTRU may be configured (e.g., preconfigured) with a default resource pool to transmit discovery (e.g., a normal resource pool). The WTRU may transmit the discovery in the default resource pool, for example, if the discovery transmission satisfies the configured (e.g., preconfigured) condition(s). The WTRU may switch to another resource pool (e.g., the exceptional resource pool), for example, if one or multiple configured conditions are not satisfied, and/or in case of a certain event. The configured condition to transmit discovery in the default resource pool may be one or any combination of the following: the CBR of the default resource pool and/or CR of the WTRU is smaller than a threshold, the QoS of the TB is within a range (e.g., priority of the TB is smaller than a threshold), the transmission of the TB belongs to a range of power (e.g., transmission power of the TB is smaller than a threshold and/or larger than another threshold), and/or the load of the WTRU is smaller than a threshold.

The WTRU may transmit discovery in a resource pool (e.g., the exceptional resource pool) based on the occurrence of one or more events. The one or more events may be: the WTRU detects RLF (e.g., Uu RLF and/or SL RLF), the WTRU has a discovery message available for transmission with a certain priority (e.g., priority above a threshold), the WTRU triggers a cell reselection, and/or a determination that a duration of time has expired (e.g., expiry of a timer), for example. The duration of time (e.g., timer) may be started based on the occurrence of any of the other events mentioned herein.

The WTRU may transmit discovery in a resource pool (e.g., the exceptional resource pool) based on triggering a cell reselection. The WTRU may be configured with conditions, for example, whereby the cell reselection may trigger transmission of discovery on the other pool, such as based on the state of the WTRU (e.g., the WTRU is in RRC_CONNECTED/RRC_INACTIVE), based on the priority of pending transmissions (e.g., the WTRU is configured with an LCH having priority above a threshold), and/or a mobility event (e.g., HO or NW controlled switch from direct to indirect or vice versa) fails, etc.

The WTRU may indicate the transmission power of the discovery message. The WTRU may indicate one or any combination of the following information related to the transmission power of the discovery message: the absolute transmission power, the information about pathloss (e.g., DL pathloss) or CBR of the resource pool, an indication of a power level (e.g., low, medium, or high transmission power) and/or power reduction level (e.g., low, medium, or high transmission reduction, etc., due to CBR and/or DL pathloss). For example, the Tx WTRU may include an indication in its transmission when its transmit power was reduced due to the congestion control. The Tx WTRU may include an indication of the amount of power decrease associated with the congestion control. The transmission power information may be indicated, for example, using SCI or signaling by MAC CE.

The WTRU may perform RSRP measurements, for example, based on the transmission power indication from Tx WTRU. The WTRU (e.g., remote WTRU) may determine the sidelink quality associated with the discovery transmission, for example, based on the measured sidelink discovery (SD)-RSRP and the transmission power indication from the Tx WTRU. The sidelink quality may be a function of the SD-RSRP and the transmission power indication parameter. For example, the sidelink quality may be determined by subtracting a delta (e.g., some (pre)configured quantity) from the measured SD-RSRP (e.g., sidelink quality=SD-RSRP−delta) if the low transmission power is indicated. The delta may be determined, for example, by additional information in the transmission power indication by the Tx WTRU. For example, the Tx WTRU may send a factor which may be used by the Rx WTRU to determine a multiplying factor to which to increase the value of delta. Whether high transmission power is transmitted may be determined, for example, by adding delta to the measured SD-RSRP (e.g., sidelink quality=SD-RSRP−delta). The sidelink quality may be determined as the measured SD-RSRP, for example, if medium transmission power is transmitted. The value of delta may be configured (e.g., preconfigured) in the resource pool.

The WTRU may determine the RSRP threshold to perform relay (re)selection. A WTRU may use the RSRP threshold (e.g., SD-RSRP threshold, SL-RSRP threshold, or Uu RSRP threshold), for example, to perform a relay (re) selection procedure. For example, the WTRU may trigger relay (re)selection if the SD-RSRP and/or SL-RSRP of the current relay is below a threshold. The WTRU may use the RSRP threshold, for example, to trigger a discovery transmission/reception procedure. For example, the WTRU may trigger discovery transmission/reception based on whether the Uu RSRP is above and/or below a (pre)configured threshold. A WTRU may use the RSRP threshold, for example, to perform a relay (re)selection procedure and trigger a discovery transmission/reception procedure in combination.

Any of the above RSRP thresholds (e.g., SD-RSRP threshold, SL-RSRP threshold, Uu RSRP threshold) may be determined based on one or any combination of the following: the transmission power indication in the discovery message, the CBR of the resource pool, the QoS of the relay service, whether the RLF is triggered or not or whether a duration of time associated with RLF or similar failure is being tracked (e.g., a timer is running), whether the WTRU is tracking a duration of time (e.g., a timer is running at the WTRU, a specific timer is running at the WTRU), and/or the Uu state of the remote WTRU.

The RSRP thresholds may be determined based on the transmission power indication in the discovery message. In examples, the WTRU may be configured (e.g., preconfigured) with one RSRP threshold. The WTRU may then determine the RSRP threshold (e.g., actual RSRP threshold) to perform relay (re)selection, for example, based on the indicated transmission power of the message. For example, the WTRU may decrease the RSRP threshold if the indicated transmission power is low. The WTRU may increase the RSRP threshold, for example, if the indicated transmission power of the message is high. The WTRU may keep the configured (e.g., preconfigured) RSRP threshold (e.g., originally configured (e.g., preconfigured) RSRP threshold), for example, if the indicated transmission power is medium. In examples, the WTRU may be configured (e.g., preconfigured) with multiple RSRP thresholds, in which each threshold may be associated with one or multiple transmission power or type of transmission power indication by the Tx WTRU. The WTRU may determine which RSRP threshold to use, for example, based on the indicated transmission power of the message.

The RSRP threshold(s) may be determined based on the CBR of the resource pool. In examples, the WTRU may be configured (e.g., preconfigured) with multiple RSRP thresholds. For example, a threshold may be associated with a CBR range. The WTRU may determine which RSRP threshold to use, for example, based on the CBR of the resource pool. The CBR of the resource pool may be measured by the WTRU or indicated by another WTRU. In examples, the WTRU may be configured (e.g., preconfigured) with a RSRP threshold. The WTRU may determine the RSRP threshold (e.g., actual RSRP threshold) to perform relay (re)selection, for example, based on the CBR of the resource pool. If CBR of the resource pool is high, the WTRU may increase the RSRP threshold. If CBR of the resource pool is low, the actual RSRP threshold may be the same as the configured (e.g., preconfigured) RSRP threshold or the actual RSRP threshold may be determined by decreasing the configured (e.g., preconfigured) RSRP threshold.

The RSRP threshold(s) may be determined based on the QoS of the relay service. For example, the WTRU may determine the RSRP threshold based on the priority (e.g., maximum expected priority) of the LCH for the relay service. The WTRU may be configured (e.g., preconfigured) with multiple RSRP thresholds. An RSRP threshold may be associated with a priority (e.g., maximum expected priority) of the relay service. The WTRU may determine which RSRP threshold to use, for example, based on the minimum expected priority of the relay service the WTRU is expecting.

The RSRP threshold(s) may be determined based on whether RLF is triggered or not, or whether a duration of time associated with RLF or similar failure is being tracked (e.g., a timer is running). The WTRU may determine the RSRP threshold for relay (re)selection and/or for transmission of discovery message, for example, based on whether RLF is triggered for the current relay or not. In examples, the WTRU may be configured (e.g., preconfigured) with two RSRP thresholds, in which one RSRP threshold may be used if RLF is not triggered and another RSRP threshold may be used if RLF is triggered. The WTRU may determine which RSRP threshold to use, for example, based on whether RLF is triggered or not.

The RSRP threshold(s) may be determined based on whether the WTRU is tracking a duration of time (e.g., whether a timer is running at the WTRU or a specific timer is running at the WTRU). The duration of time may be associated with Uu connectivity. For example, the WTRU may transmit a discovery message based on a first RSRP threshold (e.g., the WTRU is allowed to transmit discovery if Uu RSRP is above a threshold) if the duration of time is not being tracked (e.g., the timer is not running), and based on a second RSRP threshold if the duration of time is being tracked (e.g., the timer is running). The duration of time may be related to RLF, re-establishment, or similar failure handling (e.g., a timer related to RLF, re-establishment, or similar failure handling, such as T310, T311, T301, etc.).

The RSRP threshold(s) may be determined based on the Uu state of the remote WTRU. For example, the WTRU may use a first threshold in RRC_CONNECTED, a second threshold in RRC_INACTIVE, and a third threshold in RRC_IDLE.

The WTRU may determine to (re)select (e.g., select or reselect) an L2 or L3 relay. In examples, the WTRU may determine whether to (re)select the L2 or L3 relay, for example, based on one or any combination of the following: an availability of the L2 or L3 relay, the current relay (e.g., relay to which the WTRU is connected) of the WTRU, the RRC status of the WTRU, and/or the QoS of the service.

The WTRU may determine whether to (re)select the L2 or L3 relay, for example, based on the availability of the L2 or L3 relay. In examples, the WTRU may be configured (e.g., preconfigured) to prioritize one type of relay (e.g., either the L2 or L3 relay). The WTRU may select (e.g., always select) the configured (e.g., preconfigured) prioritized relay type, for example, if at least one relay belonging to the relay type is available and the at least one relay satisfies other relay (re-)selection conditions (e.g., sidelink RSRP is greater than a threshold, the relay load is smaller than a threshold, etc.). If there are no available relays for the configured (e.g., preconfigured) relay type, the WTRU may select another relay type. For example, the WTRU may be configured (e.g., preconfigured) to select the L2 relay. The WTRU may select the L2 relay, for example, if it is available and the L2 relay satisfies the relay (re)selection criteria. If there is no L2 relay satisfying the relay (re)selection criteria, the WTRU may then select the L3 relay.

The WTRU may determine whether to (re)select the L2 or L3 relay, for example, based on the current relay of the WTRU (e.g., the relay to which the WTRU is connected). For example, the WTRU may determine which relay type (e.g., the L2 or L3 relay) to select based on the current relay the WTRU is connected to. For example, if the WTRU is connecting to an L2 relay, the WTRU may prioritize to (re)select a different L2 relay. If the WTRU is connecting to the L3 relay, the WTRU may prioritize to (re)select a different L3 relay.

The WTRU may determine whether to (re)select the L2 or L3 relay, for example, based on the RRC status of the WTRU. The WTRU may determine which relay type to reselect, for example, based on the RRC status of the WTRU itself. For example, the WTRU may select the same relay type as the current relay if the WTRU is in the RRC connected state. The WTRU may prioritize to (re)select the L2 relay, for example, if the WTRU is in the RRC idle/inactive state.

The WTRU may determine whether to (re)select the L2 or L3 relay, for example, based on the QoS of the service. The WTRU may determine which relay type to select, for example based on the QoS of the service. For example, the WTRU may prioritize the L2 relay for high QoS requirement services (e.g., services having high priority data). The WTRU may prioritize the L3 relay, or the WTRU may refrain from prioritizing a relay type, for example if the QoS requirement of the service is low.

The WTRU may determine the procedure to receive configuration information related to a relay service. A WTRU (e.g., a relay) may determine to receive configuration information related to a relay service, for example, based on whether the WTRU is an L2 or an L3 relay. The configuration information may include one or any combination of the following: the resource pool for discovery, the SLRB configuration, the Uu RSRP threshold, and/or the SL RSRP threshold for relay (re)selection.

For example, the WTRU acting as the L2 relay may receive the configuration information via signaling (e.g., dedicated RRC signaling) if the WTRU is in the RRC connected mode. The WTRU acting as the L3 relay may receive the configuration information from a system information block (SIB) or a (pre-) configuration, for example, if (e.g., even if) the WTRU is in the RRC connected mode.

The WTRU may determine whether to act as an L2 or L3 relay based on an indication from a network node, such as a gNB. In examples, the WTRU may determine whether to act as an L2 or L3 relay based on the gNB response or indication, for example, in response to a request from the relay WTRU. For example, the WTRU may request the gNB to act as a relay or may request relay resources from the gNB. The WTRU may determine whether to act as an L2 or L3 relay based on the indication from the network.

The WTRU may determine whether to select an L2 or L3 relay based on an indication from a network node, such as a gNB. In examples, the WTRU may determine whether to select an L2 or L3 relay based on the indication of the discovery resource from a network (e.g., a gNB). For example, the WTRU may send the request for the discovery resource. The WTRU may determine whether to select an L2 or L3 relay based on the indication from the network.

The WTRU may send an RLF indication to remote WTRUs. The WTRU (e.g., a relay WTRU) may determine to send an RLF indication (e.g., to indicate RLF or to indicate PC5 link release), for example, based on one or any combination of the following events: the WTRU detects RLF at the relay WTRU (Uu RLF or sidelink RLF), and/or the WTRU determines to release a connection with one or multiple remote WTRUs.

The WTRU may use one or any combination of the following messages to send an RLF indication: a non-access stratum (NAS) message indication (e.g., PC5-S message indication) or an AS message indication (e.g., PC5 RRC message, MAC CE signaling, SCI).

The WTRU may determine whether to send an NAS message indication and/or an AS message indication based on one or any combination of the following: the QoS of the relay service or whether there is a connected remote WTRU or not.

The WTRU may determine whether to send an NAS message indication and/or an AS message indication based on the QoS of the relay service. For example, the WTRU may send an AS message indication for a high QoS requirement relay service. The WTRU may send an NAS message indication for a low QoS requirement relay service.

The WTRU may determine whether to send an NAS message indication and/or an AS message indication based on whether there is a connected remote WTRU or not. For example, the WTRU may send an AS message indication if there is a connected remote WTRU. Otherwise, the WTRU may send an NAS message indication (e.g., there is no connected remote WTRU).

The WTRU may determine whether to perform cell (re)selection or relay (re)selection first. The WTRU may be configured to perform cell (re)selection and/or relay (re) selection. The WTRU may be configured with rules, for example, on whether to perform cell (re)selection. The WTRU may be configured with rules, for example, on whether to perform relay (re)selection. If the WTRU is configured to perform both cell and relay (re)selection, the WTRU may be configured with criteria on which to perform first. The WTRU may determine whether to perform cell (re)selection and/or relay (re)selection and/or which to perform first based on one or any combination of the following: a (pre)configuration, the coverage status of the WTRU with respect to the network (e.g., gNB) of the current relay WTRU, the measured Uu RSRP and/or SD-RSRP, the event triggering cell (re)selection and/or relay (re)selection, the connectivity of the remote WTRU, and/or the RRC state of the remote WTRU.

The WTRU may determine whether to perform cell (re)selection and/or relay (re)selection based on a (pre) configuration. The WTRU may determine the order of performing cell (re)selection and relay (re)selection based on the (pre)configuration. For example, the WTRU may be configured (e.g., preconfigured) to perform cell (re)selection first (e.g., always perform cell (re)selection first). For example, the WTRU may be configured (e.g., preconfigured) to perform relay (re)selection first (e.g., always perform relay (re)selection first).

The WTRU may determine whether to perform cell (re)selection, relay (re)selection, and/or which to perform first based on the coverage status of the WTRU with respect to the network (e.g., gNB) of the current relay WTRU. For example, if the WTRU is out of coverage of the serving cell of the current relay WTRU (e.g., the relay WTRU to which the WTRU is connected), the WTRU may perform relay (re)selection first. The WTRU may (re)select a relay WTRU, for example, having the same cell ID with the current relay (e.g., the relay to which the WTRU is connected). If the WTRU is in coverage of the serving cell of the current relay WTRU, the WTRU may perform cell (re)selection first. The WTRU may then switch to the Uu link of the same cell ID. In this case, the WTRU may be allowed to camp in the same cell.

The WTRU may determine whether to perform relay (re)selection or cell (re)selection first based on the measured Uu RSRP and/or the measured SD-RSRP. In examples, the WTRU may perform relay (re)selection first, for example, if the measured SD-RSRP of a relay is greater than a threshold. The threshold may be (pre-)configured. In examples, the WTRU may perform cell (re)selection first if the Uu RSRP of a measured cell is greater than a configured (e.g., pre-configured) threshold. If both the SD-RSRP is greater than a configured (e.g., preconfigured) threshold and the Uu RSRP is greater than another configured (e.g., preconfigured) threshold, the WTRU may perform relay (re)selection first.

The WTRU may determine whether to perform cell (re)selection, relay (re)selection, and/or which to perform first based on the event triggering cell (re)selection and/or relay (re)selection. For example, the WTRU may perform relay (re)selection first if relay (re)selection is triggered due to a sidelink RLF event with the current relay (e.g., the relay to which the WTRU is connected). The WTRU may trigger cell (re)selection first, for example, if the relay WTRU releases the link due to congestion control event.

The WTRU may determine whether to perform cell (re)selection, relay (re)selection, and/or which to perform first based on the connectivity of the remote WTRU. For example, the WTRU may perform relay reselection first if it was connected via a relay WTRU, and may perform cell reselection first if it was connected directly via the Uu.

The WTRU may determine whether to perform cell (re)selection, relay (re)selection, and/or which to perform first based on the RRC state of the remote UE. For example, the WTRU may perform cell reselection first if it is RRC_CONNECTED, otherwise, it may perform relay reselection first.

Combinations of the above may be used to determine whether to perform cell (re)selection, relay (re)selection, and/or which to perform first. For example, the WTRU may perform relay reselection first if multiple conditions are met, or if any of a set of conditions are met. For example, a WTRU may use one condition for determining whether or not to perform a type of reselection, and a second condition for determining which reselection to perform first.

The WTRU may determine the threshold for cell (re) selection. In examples, the WTRU may determine the threshold for cell (re)selection and/or relay (re)selection, which may include one or more of the following: the Uu RSRP threshold of the current cell to perform cell (re) selection, the Uu RSRP threshold of the candidate cell to perform cell (re)selection, the SL-RSRP of the current relay in which to trigger relay (re)selection, and/or the allowable SD-RSRP of a relay (e.g., a relay suitable for selection) for relay (re)selection.

The threshold may be determined based on one or any combination of the following: the connection status with the current relay, the type of the current relay (e.g., L2 or L3 relay), and/or whether the current cell is the serving cell of the current WTRU or not.

The threshold may be determined based on the connection status with the current relay. If the SL-RSRP and/or SD-RSRP with the current relay is greater than a threshold (e.g., the WTRU has a good connection with the current relay), the WTRU may decrease the Uu RSRP threshold to perform cell (re)selection. Unnecessary cell (re)selection events may be reduced, for example, if the WTRU already has a good connection with a relay.

The threshold may be determined based on whether the current cell is the serving cell of the current relay WTRU or not. The WTRU may be configured (e.g., preconfigured) with two Uu RSRP thresholds to perform cell (re)selection. For example, one threshold may be used if the current cell is the serving cell of the relay WTRU, and the other threshold may be used if the current cell is not the serving cell of the relay WTRU. The WTRU may determine which threshold to use, for example, based on whether the current camping gNB is serving the current relay of the WTRU.

The WTRU may determine to refrain from performing congestion control for discovery transmissions. The WTRU may determine that the transmission power of the discovery message is not limited by CBR of the resource pool. The transmission power may be a function of downlink pathloss. The WTRU may be allowed to reach relay WTRUs, for example, in case of congestion in the resource pool.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising;
a memory; and
  a processor connected to the memory, wherein the processor is configured to:
    receive configuration information that comprises an indication that indicates a resource pool, wherein the configuration information indicates whether the resource pool is dedicated to transmission of discovery information, wherein if the resource pool is dedicated to transmission of discovery information, the resource pool is limited to transmitting discovery information;

receive a grant associated with a sidelink transmission, wherein the grant indicates to use the resource pool; and on a condition that the configuration information indicates that the resource pool is dedicated to transmission of discovery information, send the sidelink transmission using the resource pool, wherein the sidelink transmission is limited to discovery information.

2. The WTRU of claim 1, wherein, if the configuration information indicates that the resource pool is not dedicated to transmission of discovery information, the sidelink transmission is not limited to transmission of discovery information.

3. The WTRU of claim 1, wherein the condition is a first condition, and wherein the processor is further configured to:

determine that a second condition is satisfied; and based on the determination that the second condition is satisfied, apply a link control protocol (LCP) restriction, wherein a content associated with the sidelink transmission is determined based on the applied LCP restriction.

4. The WTRU of claim 3, wherein the second condition is associated with one or more of a channel busy ratio associated with the resource pool, an allowable transmit power, a size of the grant associated with the sidelink transmission, or a priority associated with the sidelink transmission.

5. The WTRU of claim 1, wherein the sidelink transmission comprises at least one of discovery information or data information.

6. A method comprising:

receiving configuration information that comprises an indication that indicates a resource pool, wherein the configuration information indicates whether the resource pool is dedicated to transmission of discovery information, wherein if the resource pool is dedicated to transmission of discovery information, the resource pool is limited to transmitting discovery information;

receiving a grant associated with a sidelink transmission, wherein the grant indicates to use the resource pool; and on a condition that the configuration information indicates that the resource pool is dedicated to transmission of discovery information, sending the sidelink transmission using the resource pool wherein the sidelink transmission is limited to discovery information.

7. The method of claim 6, wherein, if the configuration information indicates that the resource pool is not dedicated to transmission of discovery information, the sidelink transmission is not limited to transmission of discovery information.

8. The method of claim 6, wherein the condition is a first condition, and wherein the method further comprises:

determining that a second condition is satisfied; and based on the determination that the second condition is satisfied, applying a link control protocol (LCP) restriction, wherein a content associated with the sidelink transmission is further determined based on the applied LCP restriction.

9. The method of claim 8, wherein the second condition is associated with one or more of a channel busy ratio associated with the resource pool, an allowable transmit power, a size of the grant associated with the sidelink transmission, or a priority associated with the sidelink transmission.

10. The method of claim 6, wherein the sidelink transmission comprises at least one of discovery information or data information.

* * * * *